United States Patent
Jacoby et al.

(10) Patent No.: US 11,867,928 B2
(45) Date of Patent: Jan. 9, 2024

(54) METHODS AND ASSEMBLIES RELATING TO THE MANUFACTURE OF VARIABLE FOCUSING POWER OPTICAL DEVICES

(71) Applicant: ADLENS LTD, Eynsham (GB)

(72) Inventors: Thomas Norman Llyn Jacoby, Eynsham (GB); Robert Edward Stevens, Eynsham (GB); Tom Worsley, Eynsham (GB)

(73) Assignee: ADLENS LIMITED, Eynsham (GB)

( * ) Notice: Subject to any disclaimer, the term of this patent is extended or adjusted under 35 U.S.C. 154(b) by 753 days.

(21) Appl. No.: 17/043,199

(22) PCT Filed: Mar. 28, 2019

(86) PCT No.: PCT/GB2019/050906
§ 371 (c)(1),
(2) Date: Sep. 29, 2020

(87) PCT Pub. No.: WO2019/186182
PCT Pub. Date: Oct. 3, 2019

(65) Prior Publication Data
US 2021/0026044 A1    Jan. 28, 2021

(30) Foreign Application Priority Data

Mar. 29, 2018 (GB) ..................... 1805297

(51) Int. Cl.
*G02B 3/14* (2006.01)
*B65B 3/04* (2006.01)
*G02C 7/08* (2006.01)

(52) U.S. Cl.
CPC .................. *G02B 3/14* (2013.01); *B65B 3/04* (2013.01); *G02C 7/085* (2013.01)

(58) Field of Classification Search
CPC .............. G02B 3/14; B65B 3/04; G02C 7/085
(Continued)

(56) References Cited

U.S. PATENT DOCUMENTS

| 1,810,822 A | 6/1931 | Erickson |
| 4,494,585 A | 1/1985 | Waldecker |

(Continued)

FOREIGN PATENT DOCUMENTS

| CN | 1949005 A | 4/2007 |
| CN | 105143926 A | 12/2015 |

(Continued)

OTHER PUBLICATIONS

Office Action issued for Taiwan Patent Application No. 108111246 dated Mar. 17, 2023, 4 pages.

(Continued)

*Primary Examiner* — William Choi
(74) *Attorney, Agent, or Firm* — Rothwell, Figg, Ernst & Manbeck, P.C.

(57) ABSTRACT

Methods of filling an envelope (16) of a compression-type adjustable optical device (10), such as a liquid lens or mirror, which is formed in part by a distensible membrane (11) having an exterior optical surface, with a substantially incompressible fluid (15) to a predetermined optical power or radius of curvature; the methods comprising pumping fluid into the envelope (16) under vacuum through a fluid supply conduit (23) in fluid communication with an interior of the envelope (16) while allowing air to escape from the envelope through a fluid overflow conduit (26) in fluid communication with the interior of the envelope (16); continuing to pump fluid (15) into the envelope (16) to cause the membrane (11) to distend to an optical power of the optical device (10) that is greater than the predetermined optical power while allowing excess fluid (15) to escape from the envelope through the overflow device (26); slowing or stopping the supply of fluid to the envelope (16), thereby to allow the membrane (11) progressively to relax and monitoring the optical power of the optical device (10) until it (Continued)

falls to the predetermined optical power; removing the fluid supply conduit (23) and fluid overflow conduit (26); and thereafter sealing the envelope (16). Also disclosed is an overflow device having a deflector portion (261) and a filling device (280) for use in the methods of the invention.

20 Claims, 19 Drawing Sheets

(58) Field of Classification Search
USPC .................................................. 359/665, 666
See application file for complete search history.

(56) References Cited

U.S. PATENT DOCUMENTS

| | | |
|---|---|---|
| 5,554,100 A | 9/1996 | Leiner et al. |
| 5,973,852 A * | 10/1999 | Task .................... G02B 3/14 |
| | | 359/666 |
| 2015/0116656 A1 | 4/2015 | Stevens et al. |

FOREIGN PATENT DOCUMENTS

| | | |
|---|---|---|
| TW | 401522 B | 8/2000 |
| WO | 9638744 A1 | 12/1996 |
| WO | 2013144533 A1 | 10/2013 |
| WO | 2014118546 A1 | 8/2014 |

OTHER PUBLICATIONS

International Search Report and Written Opinion for PCT/GB2019/050906 dated Sep. 19, 2019, 18 pages.

* cited by examiner

Detail B

Detail B

METHODS AND ASSEMBLIES RELATING TO THE MANUFACTURE OF VARIABLE FOCUSING POWER OPTICAL DEVICES

CROSS REFERENCE TO RELATED APPLICATION

This application is a 35 U.S.C. 371 National Phase Entry Application from PCT/GB2019/050906, filed Mar. 28, 2019, which claims priority to United Kingdom Patent Application No. 1805297.7, filed Mar. 29, 2018, the disclosures of which are incorporated herein in their entirety by reference, and priority is claimed to each of the foregoing.

FIELD OF THE INVENTION

The present invention relates to the manufacture of variable focusing power fluid-filled lenses of the compression type, especially though not exclusively for ophthalmic applications. More particularly, the present invention relates to filling fluid-filled lenses of the compression type.

BACKGROUND TO THE INVENTION

A compression-type liquid lens has a constant volume of incompressible refractive fluid in a sealed deformable enclosure. The term "compression lens" is to be understood as distinguishing from fluid-injection lenses in which the volume of fluid in the lens is changed by exchanging fluid between the enclosure and a separate reservoir via a pump or injector. The enclosure of a compression lens will in general have one wall comprising a distensible tensioned membrane held at its edges by a membrane support structure that may be rigid or may be resiliently bendable depending on the application. A second wall of the enclosure will in general face the first wall and either be substantially rigid or will be supported on a substantially rigid member, such as a hard ophthalmic lens. At least one side wall will bound the enclosure, and that wall will be in some sense collapsible. The side wall may be flexible as disclosed in WO 2013/144533 A1, the contents of which are incorporated herein by reference, of a bellows type as disclosed in U.S. Pat. No. 8,708,487 B2, or some other type.

Actuation of a compression lens may be effected by moving the support structure or a part thereof of the first wall towards or away from the second wall, thereby changing the shape of the enclosure and causing the membrane to distend or flatten. Such movement may be accomplished by the use of control points on the membrane support structure. A control point is any part of the membrane support structure that is controlled in position relative to the rigid wall. Control may mean that the control point is held a fixed distance from the rigid second wall (a so-called "hinge point" or static control point) or it may mean that the point is actively moved towards or away from the rigid wall (an "actuation point" or active control point). Typically, a lens may have a plurality of active and static control points as disclosed for example in WO 2013/1144592 A1, the contents of which are incorporated herein by reference.

Alternative actuation concepts include holding the membrane support structure at a fixed distance from the second wall at a plurality of static control points while the curvature of the support structure in a direction substantially normal to the plane of the undeformed membrane is changed, as disclosed in PCT application number PCT/GB2019/050106 and UK patent application number GB1801905.9, the contents of which are incorporated herein by reference.

A problem to be solved by the present invention is how to fill an enclosure such that no bubbles are present in the fluid.

Another problem pertains to ensuring that the correct volume of fluid is in the enclosure such that when the membrane is deformed the lens has the desired optical power.

Given a deformable enclosure of the kind described above in which there are control points datumed to the rigid second wall, designed-for optical performance will be critically dependent upon fluid volume in the enclosure; an over-full lens, for instance, will not only have too positive an optical power in its initial state but, where the membrane non-round, is also likely to have pronounced astigmatism.

The volume to be injected is complicated if certain choices are made as to the materials used in the lens. For instance, a membrane material that performs very well in holding tension over long times may be selected from the 1100 series of thermoplastic aromatic polyurethanes (TPU) grades that are commercially available from BASF; for instance 1185A10, which is formed from diphenylmethane-4,4'-diisocyanate (MDI), polytetramethylene glycol and 1,4-butanediol and has a Shore A hardness of about 86, a density of about 1.12 g/cm3, a tensile strength of about 33 MPa and a tear strength of about 105 N/mm. Further particulars of these materials are disclosed in WO 2017/055787 A2, the contents of which are incorporated herein by reference. A fluid for use in an ophthalmic lens should: be colourless or nearly so; have a high refractive index of above about 1.5; not be hazardous, for instance it should have low toxicity and flammability; be stable and suffer no changes of state over some operating range of temperatures; have low volatility; have low microbial growth. Suitable fluids include phenylated siloxanes; for example pentaphenyltrimethyltrisiloxane, which is commercially available as DC 705 oil from Dow Corning. When placed in contact with the fluid, the membrane material absorbs around 20% by weight of the fluid, as shown in FIG. 1 of the accompanying drawings, which is a plot of data from November 2013 of percentage gain in weight by BASF 1185A10 soaked in DC705 oil at different temperatures as a function of that temperature. The soaking of fluid into the membrane is associated with lenses becoming less positively powered with time, as shown by the data of FIG. 2. FIG. 2 shows a progressive change in optical power (Nearest Equivalent Sphere, NES) from the initial value at the time of bunging for a lens assembly of the kind disclosed by WO 2013/144592 A1. Lenses were mostly stored at 40° C., with some at 52° C., to accelerate absorption of fluid into the membrane (e-folding timescales for absorption at those temperatures are around 20 hours and 10 hours respectively). Outliers with large negative changes in NES are probably leaking. The fit to the data is:

$$\Delta NES = 0.43 e^{(-t/20.4)} - 0.43$$

where t is time from filling the lens in hours and the average long term change in NES is −0.43 D.

The change in power is attributable partly to fluid loss from the enclosure into the membrane and partly to changes to the balance of forces when the membrane loses tension as it swells when it absorbs the oil. The material choice dependent complication hitherto mentioned is therefore that one effectively needs to overfill the lens in order to get the desired final volume.

SUMMARY OF THE INVENTION

The present invention comprehends filling a deformable enclosure of a dry lens assembly with a fluid in a vacuum chamber; having a feature in a fill system that allows gas and liquid to leave the lens assembly; overfilling the enclosure such that the optical power of the lens assembly is more positive than a predetermined sealing value and using a lens meter or equivalent device whilst fluid exits the enclosure, and sealing the enclosure at the predetermined sealing value.

The sealing value may be different from a final desired value.

In a first aspect of the present invention, therefore, there is provided a method of filling an envelope of a compression-type adjustable optical device, such as a liquid lens or mirror, which is formed in part by a distensible membrane having an exterior optical surface, with a substantially incompressible fluid to a predetermined optical power or radius of curvature; the method comprising the pumping fluid into the envelope under vacuum through a fluid supply conduit in fluid communication with an interior of the envelope while allowing air to escape from the envelope through a fluid overflow conduit in fluid communication with the interior of the envelope; continuing to pump the fluid into the envelope to cause the membrane to distend to an optical power of the optical device that is greater than the predetermined optical power while allowing excess fluid to escape from the envelope through the overflow conduit; slowing or stopping the supply of fluid to the envelope, thereby to allow the membrane progressively to relax and monitoring the optical power of the optical device as the membrane relaxes until it falls to the predetermined optical power; removing the fluid supply conduit and fluid overflow conduit; and thereafter sealing the envelope.

The fluid overflow conduit may comprise an elongate body portion having an inlet portion at a distal end and an outlet portion at a proximal end and defining an interior passageway that extends between a fluid inlet in the inlet portion and a fluid outlet in the outlet portion. The inlet portion may be connected to the optical device during filling. By 'distal' and 'proximal' herein are meant closer to the optical device and further away from the optical device respectively. The overflow conduit may be a rigid, integrally formed single-piece component made, for example, from a thermoplastic, such as polycarbonate, or any solid material that would not be degraded by the fluid in the device. Alternatively, the overflow conduit may comprise rigid several components interconnected by flexible tubes made, for example, from silicone rubber. For example, the overflow conduit may comprise separate outlet, inlet, and body portions which are interconnected by silicone tubes.

The fluid overflow conduit is suitably dimensioned to restrict the flow of excess fluid from the envelope, such that after slowing or ceasing the supply of fluid to the envelope, the volume of fluid in the envelope decreases progressively at rate that allows the power of the optical device to be monitored accurately and the optical device sealed at the desired optical power.

The optical device and fluid overflow conduit may be connected and arranged during filling such that the body portion extends vertically away from the optical device.

The body portion may comprise a deflector portion that is disposed exteriorly of the body portion intermediate the distal end and the proximal end. The deflector portion may be shaped to deflect fluid exiting from the fluid outlet away from the optical device.

The fluid overflow conduit may be disposed within an overflow device that is separate from the fluid supply conduit. The overflow device may be connected to the optical device during filling and removed after filling.

Alternatively, the fluid supply conduit and the fluid overflow conduit may be arranged coaxially with one another. The fluid supply conduit may disposed interiorly of the fluid overflow conduit. The fluid supply conduit may comprise a hollow tube that extends longitudinally in the interior passageway of the body portion; the interior of the hollow tube constituting the fluid supply conduit and a peripheral region of the interior passageway surrounding the tube constituting the fluid overflow conduit. As described above, the area of the peripheral region comprising the overflow conduit may suitably be restricted in whole or part to limit the speed of excess fluid exiting the envelope.

The hollow tube may have a distal end portion that releasably carries a resilient bung member at a distal end thereof. The method may comprise the steps of inserting the distal end portion through a port in the optical device for filling the envelope, and sealing the envelope after filling by withdrawing the hollow tube from the optical device such that the bung member enters into and seals the port and detaches from the distal end of the hollow tube, thereby allowing the hollow tube to be removed. The port may be formed by the inlet portion of the body portion which is connected to the optical device during filling. The port may be formed in the optical device. The hollow tube may comprise a hollow needle. The hollow tube may comprise a fluid delivery orifice near the distal end of the hollow tube. The orifice may suitably be formed in a wall of the hollow tube, typically in a side wall of the tube. The orifice may be a lateral orifice. The hollow tube may be formed from a malleable metal; for example, copper or brass. The hollow tube may be left in situ after the filling process has been completed by cutting of a distal end of the hollow tube. If left in situ, the hollow tube may be sealed by crimping the hollow tube or by using an adhesive.

The optical device may define an optical axis. The person skilled in the art will understand the term 'optical axis' to mean a line along which a ray of light passing through the optical device or being reflected off it does not incur a change of direction. Normally, the optical device is configured such that in use a user looks straight ahead along the optical axis.

The method of the invention may comprise holding the optical device with the optical axis oriented substantially horizontally during filling. The optical device may be disposed within a vacuum chamber during filling under vacuum. The method may comprise heating and/or degassing the fluid prior to it being introduced into the envelope. The method may comprise storing the fluid under vacuum prior to being introduced into the envelope.

According to a second aspect, the present invention provides an overflow device for use in filling an envelope of a compression-type adjustable optical device, such as a liquid lens or mirror, which is formed in part by a distensible membrane having an exterior optical surface, with a substantially incompressible fluid to a particular focal length or radius of curvature under vacuum. The overflow device comprises an elongate hollow body portion that has an inlet portion at a distal end defining a fluid inlet and an outlet portion at a proximal end defining a fluid outlet and defines an interior passageway forming a fluid overflow conduit between the fluid inlet and the fluid outlet, and a deflector portion that is disposed exteriorly of the body portion intermediate the inlet portion and outlet portion. The inlet portion may be adapted to be connected to an interior of the envelope to be filled, and the deflector portion may be shaped to deflect fluid flowing out of the fluid outlet away from the overflow device.

The inlet portion may be adapted to be inserted into the envelope of the optical device to be filled. The inlet portion may be needle-like having a sharp end for puncturing a puncturable a re-sealable wall of the envelope. Alternatively, the inlet portion may be adapted to be inserted into and form a seal with an opening formed in the optical device that communicates with the interior of the envelope. The inlet portion may be generally tubular, having a longitudinal axis and an outer surface that is circular in cross-section orthogonally to the longitudinal axis. The inlet portion may be adapted to be connected to an interior channel of the optical device that communicates with the interior of the envelope. The inlet portion may be joined to the optical device. As mentioned, above the inlet portion of the overflow device may be dimensioned to regulate the flow of fluid from the envelope into the interior passageway.

The overflow device may comprise a frangible portion such that at least part of the overflow device can be removed from the optical device after filling. The body portion may be formed as a single piece. The body portion may comprise an inlet section that includes the inlet portion, an optional intermediate section and an outlet section that includes the outlet portion which are adapted to be assembled together to form the body portion.

The deflector portion may be disposed proximate the fluid outlet. The deflector portion may be formed integrally with the outlet portion. The deflector portion may include a spout portion. The spout portion may be shaped such that when the body portion is arranged vertically with the outlet portion disposed above the inlet portion, the spout portion deflects fluid exiting from the fluid outlet away from the body portion. The deflector portion may be wider than the body portion. The deflector portion may provide an angled surface that circumferentially surrounds the main body. For example, the deflector portion may take the form of an inverted cone or dish-shape that concentrically surrounds the main body. Alternatively, the deflector may have a flat surface that projects outwardly, orthogonally to the main body.

The overflow device may comprise an elongate bung-carrier member that extends through the interior passageway in the body portion and comprises a distal end portion protruding from the fluid inlet of the body portion and having a bung-carrying portion at a distal end thereof. The overflow device may comprise a bung member that has a distal head portion dimensioned to fit within the inlet portion of the body portion to seal the fluid inlet and a proximal tail portion configured to engage releasably with the bung-carrying portion at the distal end of the bung-carrier member. The bung-carrier member may be slidable in the passageway of the body portion; the arrangement being such that with the bung member carried on the distal end of the bung-carrier member by inter-engagement of its proximal tail portion with the bung-carrying portion of the bung-carrier member, the bung-carrier member can be withdrawn proximally in the body portion, thereby causing the distal head portion of the bung member to enter into and seal the inlet portion of the body portion and releasing the proximal tail portion from the bung-carrying portion of the bung-carrier member, thereby allowing the bung-carrier member to be removed with the envelope sealed by the inlet portion and bung member.

The bung-carrier member may comprise a hollow tube which forms a fluid supply conduit for delivering fluid to the optical device, e.g. a needle. The hollow tube may have a proximal end portion that protrudes from the fluid outlet of the body portion and has a connector for connection to a pumped supply of fluid. The connector may comprise a Luer fitting or any other suitable fitting. The bung member may be shaped to prevent entry of the whole bung member into the inlet portion of the body portion. At least part of the bung member may be longitudinally slidable into the inlet portion. As with the first aspect, the tube may have a fluid delivery orifice formed close to its distal end; for example, in a side-wall of the tube.

The bung member may comprise an enlarged stop at or near its distal end to prevent complete entry of the bung member into the inlet portion. The enlarged stop may for example comprise one or more formations that project from a side of the bung member, or the bung member may comprise a circumferential rib having an outer diameter larger than an internal diameter of the inlet portion. Alternatively, the bung member may comprise a bell- or cone-shaped body portion that comprises an outer diameter at its distal end that is larger than an internal diameter of the inlet portion.

According to a third aspect, the present invention provides a wall component for a compression-type adjustable optical device, such as a liquid lens or mirror, having a fluid-filled envelope that is formed at least in part by a distensible membrane and an opposing inflexible wall that is formed by or supported by such a wall component; the wall component comprising a hard member having a first surface that is configured to form or support the inflexible wall of the envelope of the optical device and being formed with an interior channel that opens onto the first surface of the hard member; and an overflow portion comprising an elongate hollow body portion having a distal end portion that is removably attached to the hard member and a proximal end portion, and a deflector portion that is disposed exteriorly of the body portion intermediate the distal end portion and the proximal end portion; wherein the body portion defines an interior passageway forming a fluid overflow conduit that extends between the distal end portion of the body portion where it connects to the interior channel in the hard member and a fluid outlet defined by the proximal end portion of the body portion, the body portion extending away from the hard member; the arrangement being such that excess fluid introduced into the envelope of the optical device during filling can flow into the fluid overflow conduit provided by the interior passageway of the overflow portion from the interior channel formed in the hard member and then out of the fluid outlet of the body portion; the deflector portion being shaped to deflect fluid exiting from the fluid outlet away from the overflow device.

The body portion may be formed integrally with the hard member and may be connected thereto by a frangible portion to allow the body portion to be removed from the hard member after filling. Alternatively, the body portion may be formed separately from and detachably connected to the hard member. The hard member may comprise an optically clear plate having a second exterior optical surface on an opposite side of the plate from the first surface. Alternatively, the second exterior optical surface may have a non-zero optical power. For example, the hard member may comprise a meniscus lens.

The interior channel may comprise a first relatively wide section proximate the first surface of the hard member and a second relatively narrow section proximate the distal end portion of the body portion of the overflow portion. The wall component may further comprise an elongate bung-carrier member that extends through the passageway in the body portion and comprises a distal end portion protruding into the first relatively wide section of the interior channel and having a bung-carrying portion at a distal end thereof, and a bung member that has a distal head portion dimensioned to form a tight fit in the second relatively narrow section of the interior channel to seal the interior channel after filling the envelope and a proximal tail portion configured to engage releasably with the bung-carrying portion at the distal end of the bung-carrier member. The bung-carrier member may be longitudinally slidable in the passageway of the body portion. The arrangement may be such that with the bung member carried on the distal end of the bung-carrier member by inter-engagement of its proximal tail portion with the bung-carrying portion of the bung-carrier member, the bung-carrier member can be retracted proximally within the body portion, thereby causing the distal head portion of the bung member to enter into and seal the second relatively narrow section of the interior channel and releasing the proximal tail portion from the bung-carrying portion of the bung-carrier member, thereby allowing the bung-carrier member to be completely removed from the interior channel with the envelope sealed by the bung member.

The bung-carrier member may comprise a hollow tube forming a fluid supply conduit for delivering fluid to the envelope and having a fluid delivery orifice proximate the distal end thereof. The hollow tube may have a proximal end portion that protrudes from the fluid outlet of the body portion and a connector for connection to a pumped supply of fluid. The tube may have a fluid delivery orifice formed close to its distal end, as described above. For example, in a side-wall of the tube.

As mentioned above, the bung member may be shaped to prevent entry of the whole bung member into the second relatively narrow section of the interior channel. The size of the interior passageway or at least at its distal end is such as to regulate the flow of fluid out of the envelope after over-filling.

According to a fourth aspect, the present invention provides a wall component and filling device for a compression-type adjustable optical device, such as a liquid lens or mirror, having a fluid-filled envelope that is formed at least in part by a distensible membrane and an opposing inflexible wall which is formed by or supported the wall component. The filling device may comprise a hollow tube forming a fluid supply conduit that is adapted for connection to a pumped supply of fluid and comprises a distal end portion having a bung-carrying portion at a distal end thereof and a fluid delivery orifice proximate the distal end, and a detachable bung member similar to the second and third aspects of the invention. The wall component may comprise a hard member having a first surface that is configured to form or support the inflexible wall of the envelope and being formed with an interior channel that extends through the hard member between one end where it opens onto the first surface of the hard member and another end which is adapted to receive the distal end portion of the hollow tube. The interior channel may comprise a first relatively wide section proximate the one end of the interior channel and a second relatively narrow section proximate the other end of the interior channel. The hollow tube may be configured such that its distal end portion extends into the first relatively wide section of the interior channel when the hollow tube is inserted into the other end of the interior channel. The distal end portion of the tube may extend sufficiently far enough into the interior channel to allow for fluid to be delivered into the wide section, and thereafter into the envelope, via the fluid delivery orifice. The detachable bung member may have a distal head portion that is dimensioned to form a tight fit in the second relatively narrow section of the interior channel and a proximal tail portion that is configured to engage releasably with the bung-carrying portion at the distal end of the needle. The hollow tube may be longitudinally slidable in the interior channel Suitably, the arrangement may be such that with the distal end portion of the hollow tube inserted into the first relatively wide section of the interior channel and the detachable bung member carried on the distal end of the hollow tube by inter-engagement of its proximal tail portion with the bung-carrying portion of the hollow tube, fluid can be introduced into the envelope through the hollow tube via the fluid delivery orifice in the hollow tube and the interior channel, and after filling, the hollow tube can be withdrawn from the interior channel, thereby causing the distal head portion of the bung member to enter into and seal the second relatively narrow section of the interior channel and releasing the proximal tail portion from the bung-carrying portion of the hollow tube and thereby allowing the hollow tube to be removed with the envelope sealed by the bung member in the second relatively narrow section of the interior channel.

The wall component may comprise an overflow portion comprising an elongate hollow body portion having a distal end portion that is removably attached to the hard member and a proximal end portion. The body portion may define an interior passageway forming a fluid overflow conduit that extends between the distal end portion of the body portion where it communicates with the interior channel in the hard member and a fluid outlet defined by the proximal end portion of the body portion, the body portion extending away from the hard member; the arrangement being such that excess fluid introduced into the envelope during filling can flow into the interior passageway of the overflow portion via the interior channel and out of the fluid outlet of the body portion.

As described above, the overflow portion may further comprise a deflector portion that is disposed exteriorly of the body portion intermediate the distal end portion and the proximal end portion the deflector portion and is shaped to deflect fluid exiting from the fluid outlet away from the overflow device.

According to a fifth aspect, the present invention provides a compression-type adjustable optical device, such as a liquid lens or mirror, comprising a wall component according to the third or fourth aspects of the invention.

According to a sixth aspect, the present invention provides a filling device for use in filling an envelope of a compression-type adjustable optical device, such as a liquid lens or mirror, with a substantially incompressible fluid to a particular focal length under vacuum. The envelope may be formed in part by a distensible membrane having an exterior optical surface. The filling device may comprise a hollow body portion that defines an interior passageway and has an inlet portion defining a fluid inlet to the passageway. A hollow tube forming a fluid supply conduit that is adapted for connection to a pumped supply of fluid, may extend through the interior passageway in the body portion and may comprise a distal end portion protruding from the fluid inlet of the body portion which has a bung-carrying portion at a distal end thereof and a fluid delivery orifice proximate the distal end. A detachable bung member may be provided that has a distal head portion which is shaped and dimensioned to form a tight fit within the inlet portion of the body portion to seal the fluid inlet and a proximal tail portion that is configured to engage releasably with the bung-carrying portion at the distal end of the hollow tube. The inlet portion may be adapted to be inserted into an envelope of an optical device to be filled or attached to a port on an optical device that communicates with an interior of an envelope to be filled and the hollow tube is longitudinally slidable in the passageway of the body portion. Suitably, the arrangement may be such that with the detachable bung member carried on the distal end of the hollow tube by inter-engagement of its proximal tail portion with the bung-carrying portion of the hollow tube, fluid can be admitted into the envelope though the hollow tube via the fluid delivery orifice and, after filling, the hollow tube can be retracted proximally in the body portion, thereby causing the distal head portion of the bung member to enter into and seal the inlet portion of the body portion and releasing the proximal tail portion from the bung-carrying portion of the hollow tube, thereby allowing the hollow tube to be removed from the inlet portion which is sealed with the bung member.

The body portion may be elongate and have an outlet portion at a proximal end defining a fluid outlet, the interior passageway defining a fluid overflow conduit that extends between the fluid inlet and the fluid outlet. The filling device may further comprise a deflector portion disposed exteriorly of the body portion intermediate the inlet portion and outlet portion and shaped to deflect fluid flowing out of the fluid outlet away from the overflow device; the arrangement being such the excess fluid admitted into the envelope flows into the fluid overflow conduit provided by the interior passageway of the body portion through the fluid inlet and is discharged from the fluid outlet, the deflector portion serving to deflect the fluid away from the optical device. Suitably, the body portion may be formed from a thermoplastic, such as polycarbonate, or any solid material that would not be degraded by the fluid in the lens.

DETAILED DESCRIPTION OF THE INVENTION

Following is a description by way of example only with reference to the accompanying drawings of embodiments of the various aspects of the present invention.

DETAILED DESCRIPTION

Figure 1:
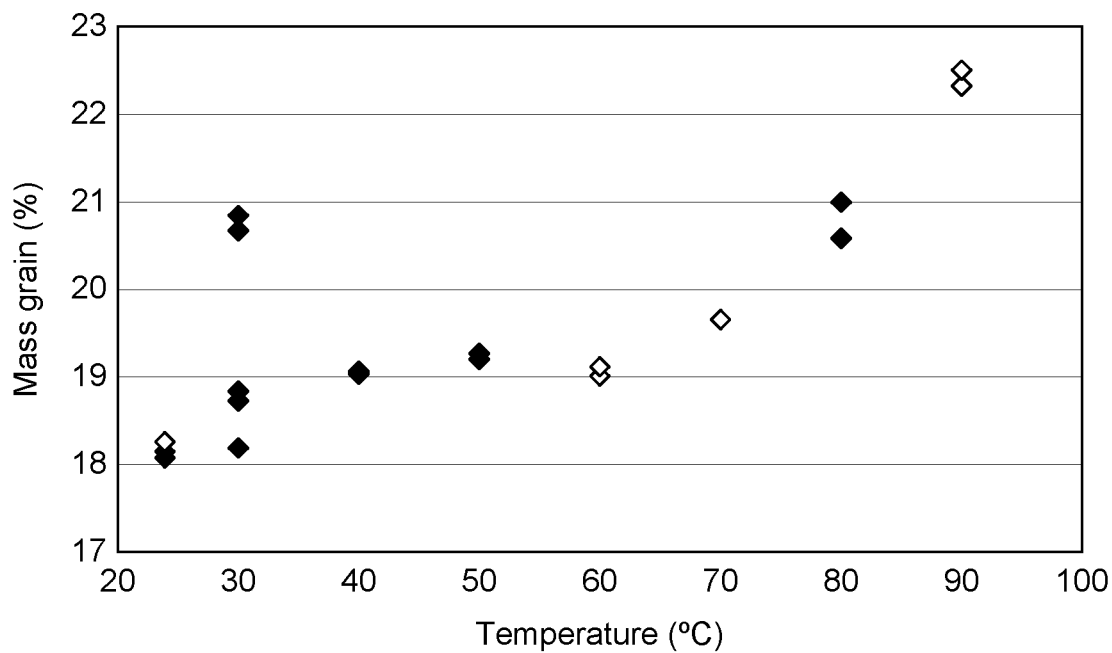
FIG. 1 shows a plot of data of percentage gain in weight by a membrane formed of BASF 1185A10 soaked in DC705 oil at different temperatures as a function of temperature.
Figure 2:
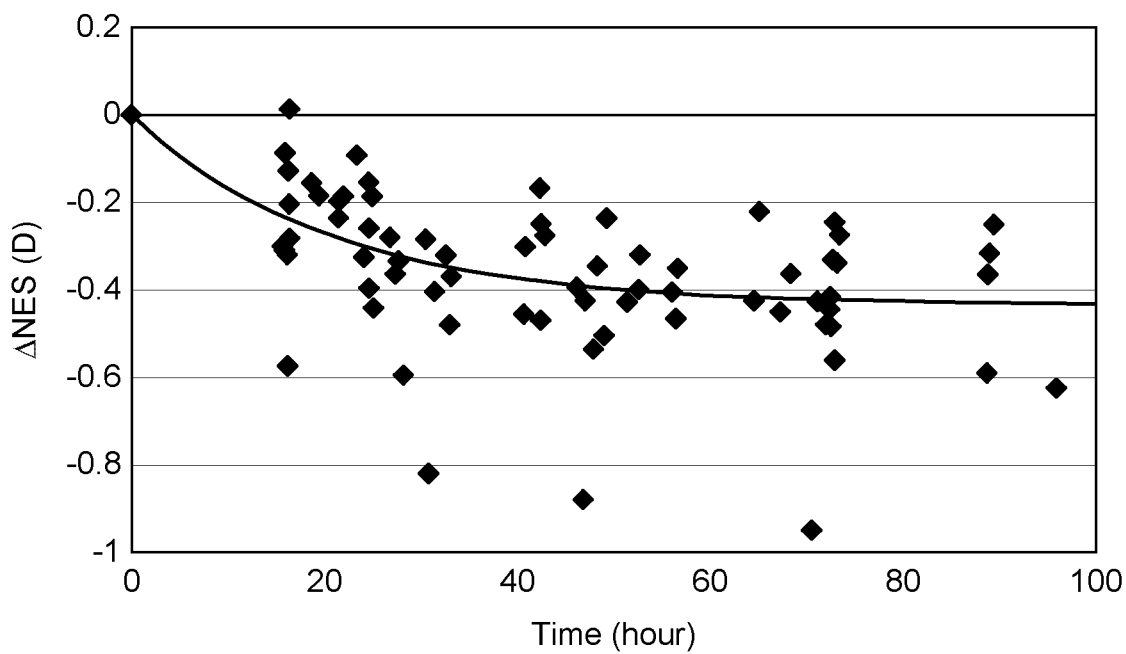
FIG. 2 shows a plot illustrating the change in optical power (Nearest Equivalent Sphere, NES) over time of fluid filled lens assemblies from an initial value at bunging.
Figure 3:
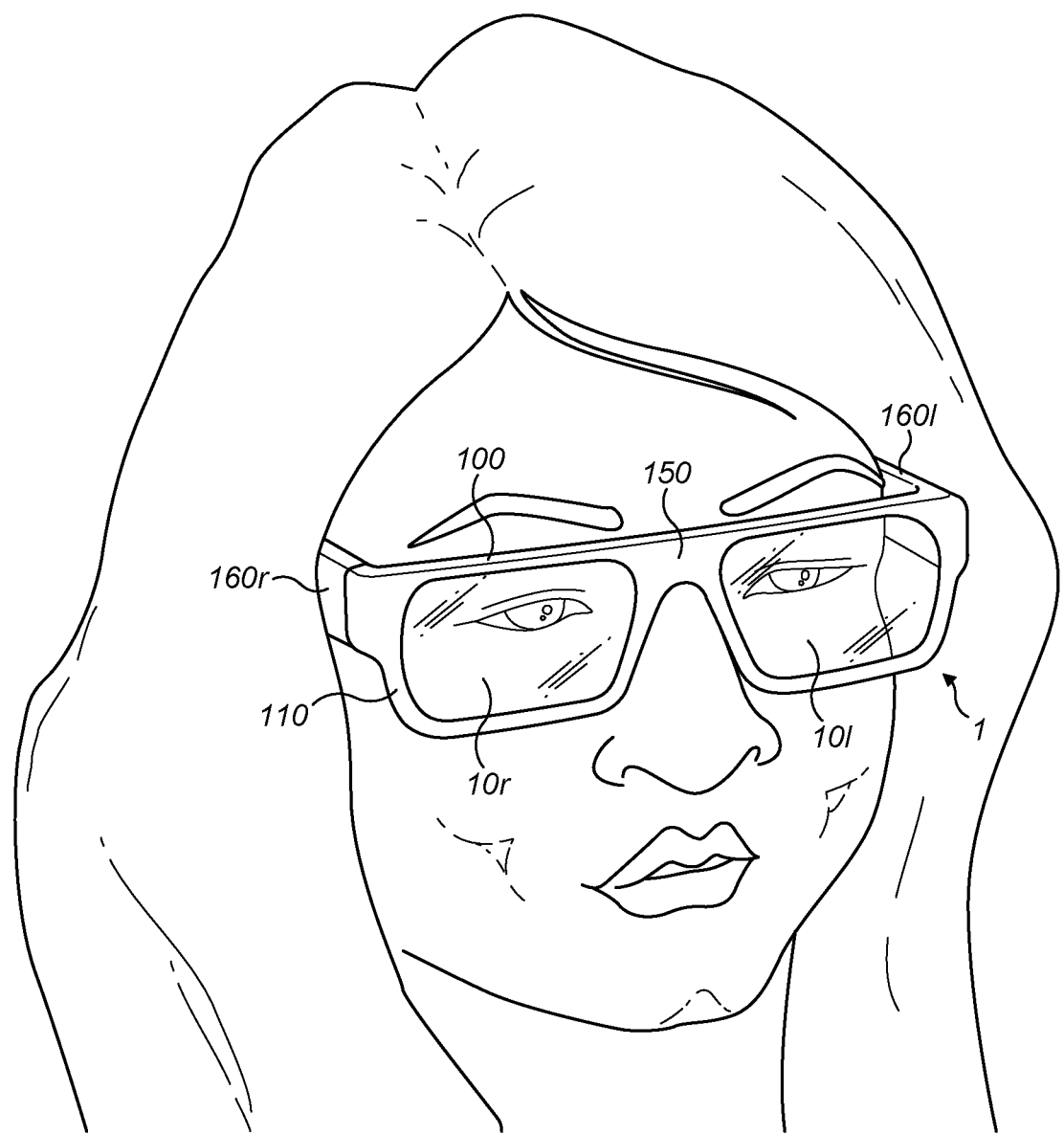
FIG. 3 shows a user wearing a pair of adjustable power eyeglasses comprising a pair of adjustable lens assemblies.

FIG. 3 shows a user wearing a pair of adjustable power eyeglasses 1 constructed in accordance with the present invention. Eyeglasses 1 comprise a frame 100 having a frame front 110 holding right and left adjustable fluid-filled lens modules 10r, 10l and right and left temple arms 160r, 160l. The frame front 110 includes a bridge part 150 interconnecting its right and left sides.

Figure 4A:
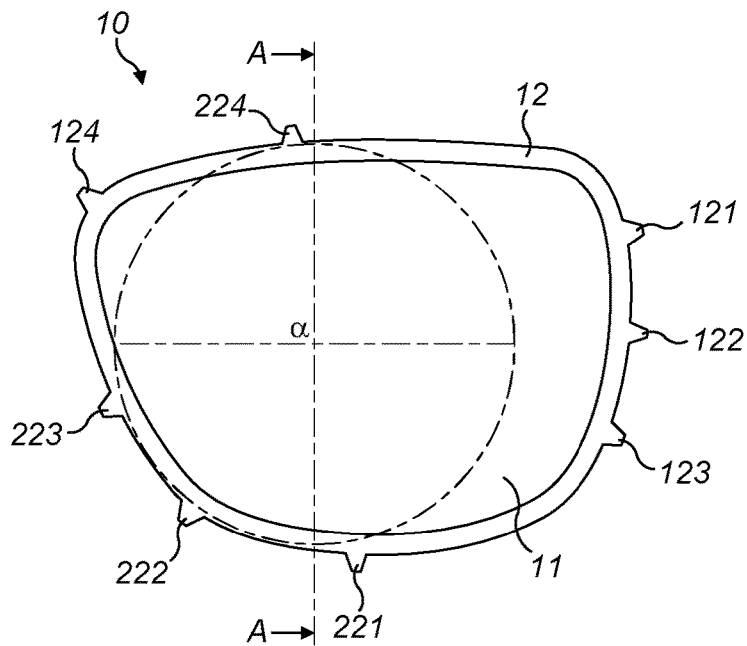
FIG. 4A is a front view of one of the adjustable lens assemblies of the eyeglasses of FIG. 3.
Figure 4B:
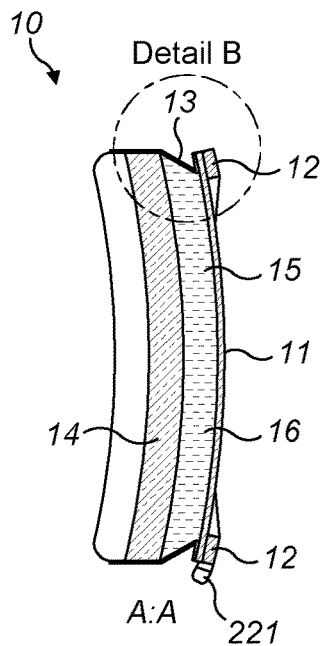
FIG. 4B is a cross-sectional side view of the adjustable lens assembly of FIG. 4A taken at the section A:A.

FIG. 4B shows a schematic side-view in cross-section, taken at A:A as indicated in FIG. 4A, of a fluid-filled lens assembly 10 that has been filled in accordance with the present invention. The lens assembly 10 has a distensible tensioned membrane 11 held around its perimeter by a support structure. In this example, the lens assembly 10 is non-round, and the support structure comprises a resiliently bendable support ring 12. Alternative support structures may comprise multiple parts and may be rigid or bendable depending on the shape of the lens and its desired optical surface profile. As can be best seen in FIG. 4A, the support ring 12 has protruding tabs representing active control points 121-124 and static control points 221-224. Means for holding and/or moving the control points as required are provided, but are omitted from the drawings for clarity.

The membrane 11 is suitably formed from a sheet of a thermoplastic polyurethane (e.g. Elastollan® 1185A10, which is made from diphenylmethane-4,4'-diisocyanate (MDI), polytetramethylene glycol and 1,4-butanediol, having a Shore A hardness of about 86, a density of about 1.12 g/cm3, a tensile strength of about 33 MPa and a tear strength of about 105 N/mm, and is commercially available from Messrs. BASF) and has a thickness of about 220 µm. Other suitable materials that may be used for the membrane 11, as well as the other components of the lens assembly 10, are disclosed by WO 2017/055787 A2, as mentioned above.

In the present embodiment, the support ring 12 is fabricated from a sheet of stainless steel and has a thickness of about 0.55 mm, but more generally the support ring may have a thickness in the range about 0.50-0.60 mm; or the support ring 12 may comprise a stack of two or more ring elements instead of a single ring. The front surface of the membrane 11 is bonded to the support ring 12 with a light curable adhesive (e.g. Delo® MF643 UV curing epoxy adhesive) or other means and is held at a line tension of about 200 Nm−1 to maintain the optical quality of the membrane 11.

Figure 4C:
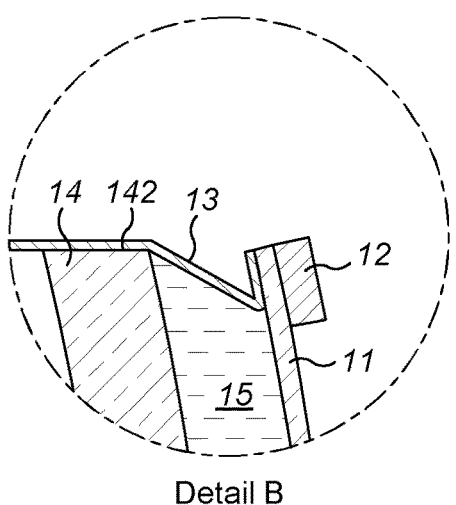
FIG. 4C is detailed cross-sectional side view of the lens assembly at Detail B in FIG. 4B.
Figure 4D:
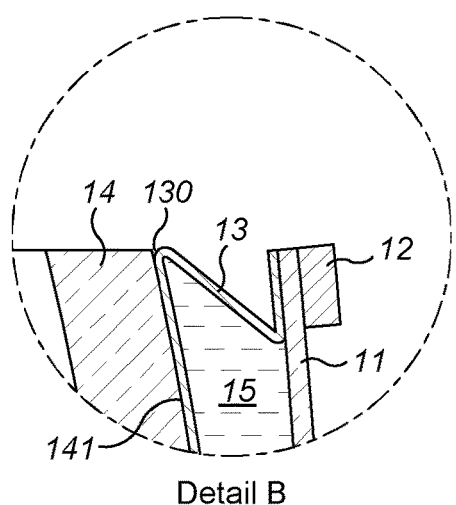
FIG. 4D corresponds to Detail B but shows an alternative construction of the adjustable lens assembly.

A hard lens 14, made of some suitable optical lens material (e.g. polymer, glass, sapphire, and so forth), and a collapsible side wall 13 are provided and form an enclosure 16 with the membrane 11 and support ring 12 that is filled with an optical fluid 15, with the membrane 11 forming a front wall of the enclosure 16 and the hard lens 14 forming a rear wall of the enclosure 16. The optical fluid 15 used is suitably a silicone oil or siloxane such, for example, as phenylated siloxanes. A preferred fluid is pentaphenyltrimethyltrisiloxane. Joints between components such as between membrane 11 and side wall 13 are made by suitable adhesives, ultrasonic welding or by some other means known in the art. In some embodiments, the side wall 13 may be attached to the hard lens 14 at its circumferential edge 142 as shown in FIG. 4C, which corresponds to Detail B indicated in FIG. 4B. In other embodiments the side wall 13 may be integral with a continuous layer across the fluid-side surface 141 of the hard lens 14 which forms a rear wall of the fluid enclosure 16 as shown in FIG. 4D, which corresponds to an alternative arrangement of Detail B indicated in FIG. 4B. Alternatively, the side wall 13 may be may be attached to the hard lens 14 in some other way. In the case of a separate rear wall extending across the fluid-side surface 141 of the hard lens 14, the two may be attached by means of a transparent adhesive 130, for instance by an optical pressure sensitive adhesive such as 8211 from 3M; and the rear wall that extends across the fluid-side surface 141 of the hard lens 14 should be transparent and of sufficiently close refractive index to the fluid 15 and lens 14 that it is substantially invisible to the user. The adjustable lens assembly 10 defines an optical axis that is substantially parallel to the z-axis.

It should be noted that lenses described in each of the following examples are substantially identical to the lens assembly 10 as described above, except where explicitly described to differ in construction. As such, in the following description the reference numerals used above to refer to the lens assembly 10 have been adhered to. New reference numerals are introduced where the construction of the lens differs from that noted above.

Example 1

Figure 5:
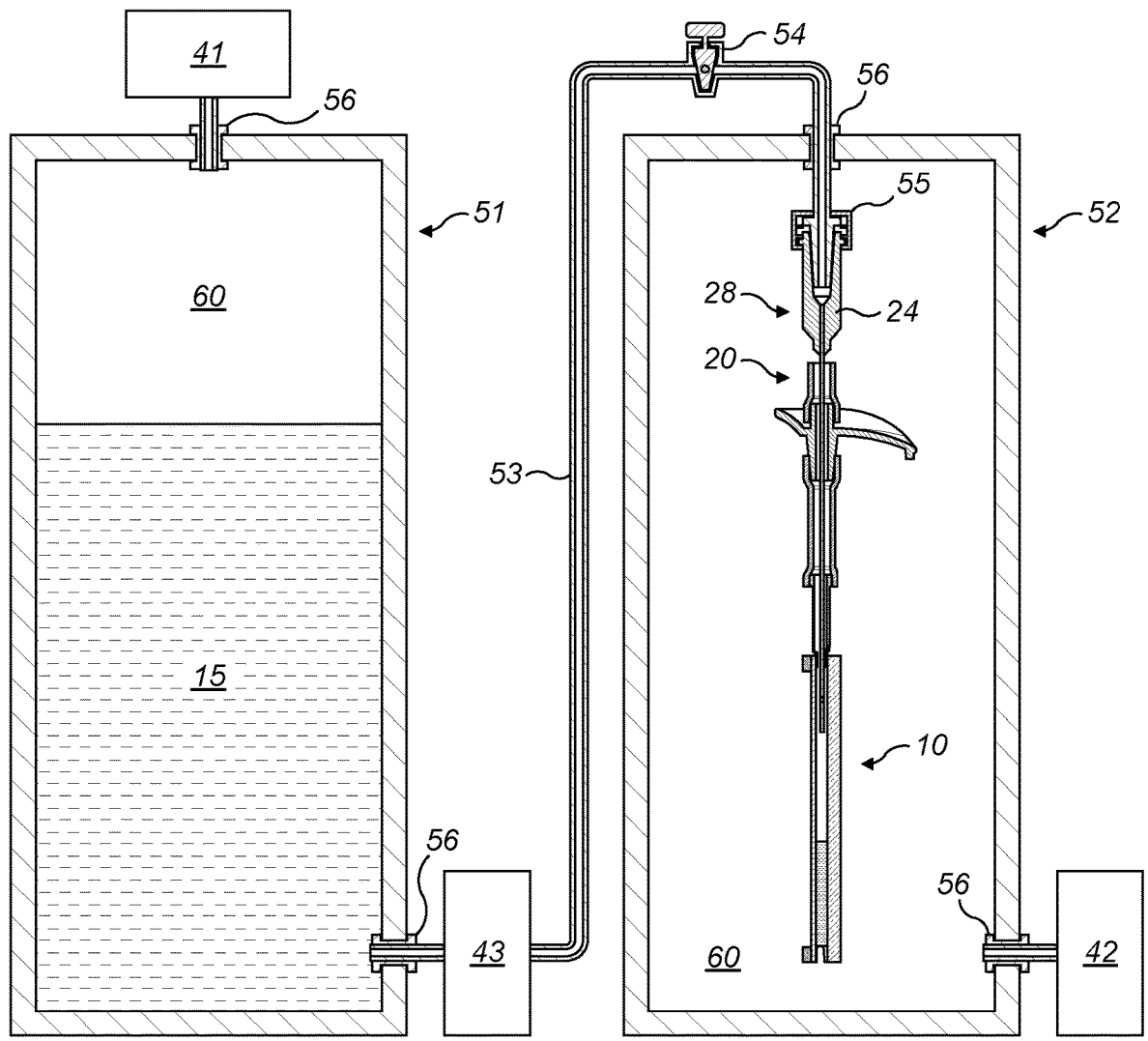
FIG. 5 is a schematic diagram of a filling system according to an embodiment of the present invention.

FIG. 5 is a schematic of an example of a filling system according to a first embodiment of the invention. A volume of the optical fluid 15 is stored in a first vacuum chamber or degassing tank 51. The degassing tank 51 is provided with a vacuum pump 41 and may be provided with a fluid heater (not shown). A fluid pump 43 is provided to pump the fluid 15 through a fluid line 53 and into the lens assembly 10 via a needle subassembly 28 secured to the end of the fluid line 53. A valve 54 is provided in the fluid line 53 for controlling fluid flow into the lens assembly 10. The fluid line 53 fits into a female Luer fitting 24 in the needle subassembly 28 via a male Luer fitting 55. Within a second vacuum chamber 52, the needle subassembly 28 is used to introduce the fluid 15 into the lens assembly 10 via a fill port assembly 20. As can be seen, during the filling process the lens assembly is vertically oriented such that the z-axis is parallel to the horizontal. The second vacuum chamber 52 is provided with a vacuum pump 42 that may the same type as first vacuum pump 41. The fluid pump 43 is operable to transfer fluid 15 from the first chamber 51 into the lens assembly 10 via the fluid line 53 and needle subassembly 28. In the drawings, vacuum fittings for fluid and gas pipes are shown schematically as grommet-like structures 56 for simplicity, though they may be O-ring compression fittings, screw fittings with gaskets or other fittings such as is known in the art. Vacuum space is indicated by a number 60 in FIG. 5.

It should be noted that the features described above in relation to FIG. 5 are common to other embodiments of the invention described below and so will not be described in detail again. However, each of the other embodiments uses a different construction of the needle subassembly 28 to provide fluid 15 to the lens assembly 10, as described in more detail below.

In this first embodiment of the invention, the needle subassembly 28 comprises a hollow needle 23 that is attached to the female Luer fitting 24 at its first end. Prior to and during the filling process, an opposite, distal end 231 of the needle 23 is plugged with a compliant bung 27. The needle 23 further comprises a side hole 25 proximate its distal end 231 so that the fluid 15 can be introduced into the lens assembly 10 via the side hole 25 while the distal end 231 of the needle is completely occluded by the bung 27. As can be best seen in FIG. 6f, the bung 27 has a body section 271 having a first diameter along a first distal cylindrical length and a tail section 29 having a second, smaller diameter along a second proximal cylindrical length. Prior to and during the filling process, the tail section 29 of the bung 27 is held in the distal end 231 end of the needle 23 by an interference fit between the inside of needle 23 and tail section 29 so that the body section 271 projects from the distal end 231 of the needle 23. At the distal end of the body section, away from the tail section 29, the bung 27 comprises a lip feature 31 that projects circumferentially from the outer surface of the bung 27. However, in other embodiments the lip feature 31 may be replaced by other formations which project outwardly from the outer surface of the bung or, for example, the bung may be substantially cone-shaped with its largest diameter being proximate its distal end.

The process of filling the lens assembly 10 in accordance with the first embodiment of the invention is described below with reference to FIGS. 6a-6j. In these drawings the degassing and filling vacuum chambers 51, 52 as well as the male Luer fitting 55 and the fluid line 53 shown in FIG. 5 are all omitted for clarity.

The needle subassembly 28 introduces fluid 15 into the lens assembly 10 via a conduit provided by the fill port assembly 20. The fill port assembly 20 comprises a tubular fill port 21 having a reduced diameter at a first distal end that is positioned within an aperture in the side-wall 13 of the lens assembly 10 and adhesively bonded in place so that the fluid 15 can be provided to the enclosure 16 through the fill port 21. The position where the fill port 21 is positioned in the side-wall 13 may advantageously be chosen to be at a point with minimal movement of support ring 12 towards and away from the hard lens 14, such as proximate a static control point (not shown). However, in some embodiments the position fill port 21 may be suitably chosen to be in a region where there are no static control points, for example.

At a second, proximal end, the fill port 21 is connected to an overflow part 26 via a silicone rubber tube 22a. The overflow part 26 comprises a substantially tubular body 262 which is configured such that the needle 23 of the needle subassembly 28 can pass through the body 262 to provide fluid to the lens assembly 10. A lip feature 261 projects circumferentially from the outer surface of the body 262 to provide a barrier that prevents excess fluid from coming into contact with the lens assembly 10 should the lens assembly 10 be overfilled, as described in more detail below. The overflow part 26 is connected to a first, lower silicone rubber tube 22a at its first distal end, as already mentioned, which corresponds to its bottom end during the filling process, and is connected to a second, upper silicone rubber tube 22b at its second proximal end. To fill the lens assembly 10 with the fluid 15, the needle 23 is inserted into the interior of the upper silicon rubber tube 22b, passed through the fill port assembly 20, and into the lens assembly 10.

Figure 6A:
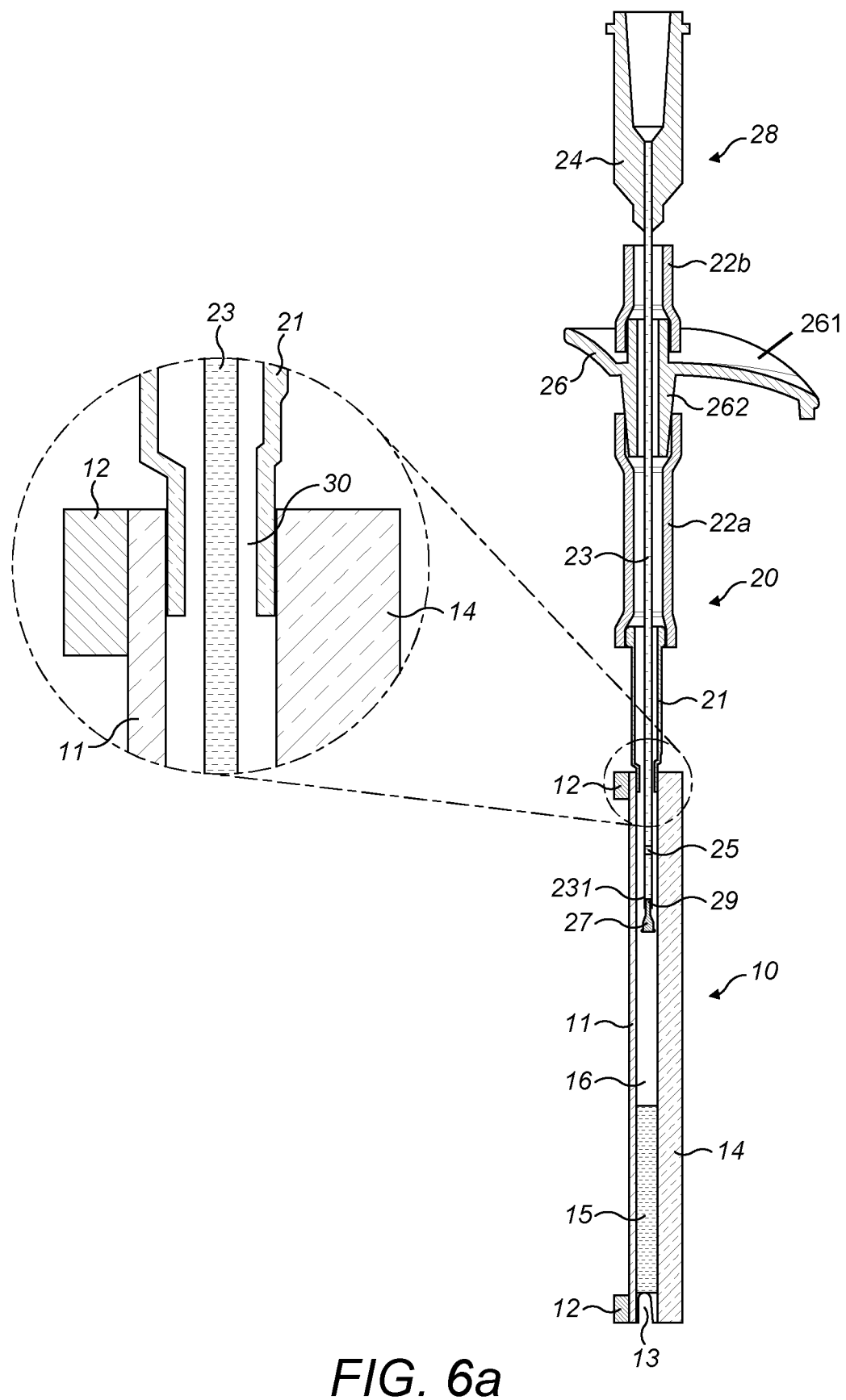
FIG. 6a shows a lens and fill port assembly of the filling system of FIG. 5 in a stage of partial fill, with an enlarged view of the coaxial space between the needle and the interior wall of the fill port from which fluid is able to escape from the lens enclosure.

FIG. 6a shows the lens assembly 10 in a stage of partial fill. As can be seen, during the filling process the lens assembly 10 is held in an upright position, as described above, with the hard lens 14 substantially vertically oriented, and with the fill port assembly 20 positioned above the lens assembly 10. In this position, the optical axis (z-axis) of the lens is substantially aligned with the horizontal. The needle 23 extends through the fill port assembly 20 such that the distal end of the needle 231 and side hole 25 are contained within the lens enclosure 16. As fluid is provided from the needle 23 to the lens enclosure 16 via the side hole 25 of the needle, gas, and later fluid when the enclosure 16 is overfilled, as described below, escape from the lens enclosure 16 via a coaxial space 30 between the needle 23 and an interior wall of the fill port 21 that is shown in the detailed view of FIG. 6a.

Figure 6B:
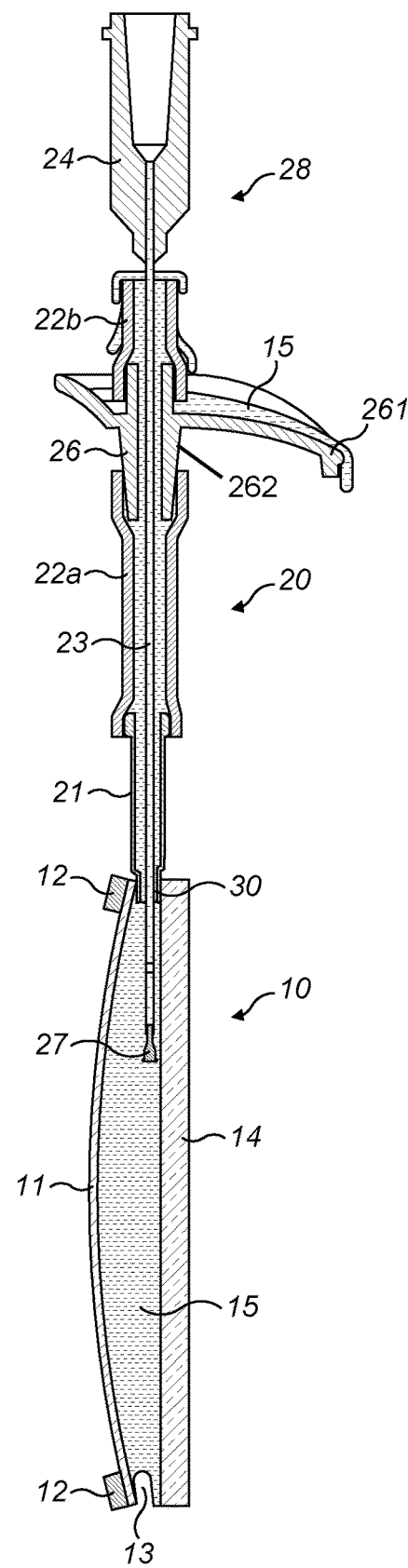
FIG. 6b shows the lens and fill port assembly with more oil transferred.
Figure 6C:
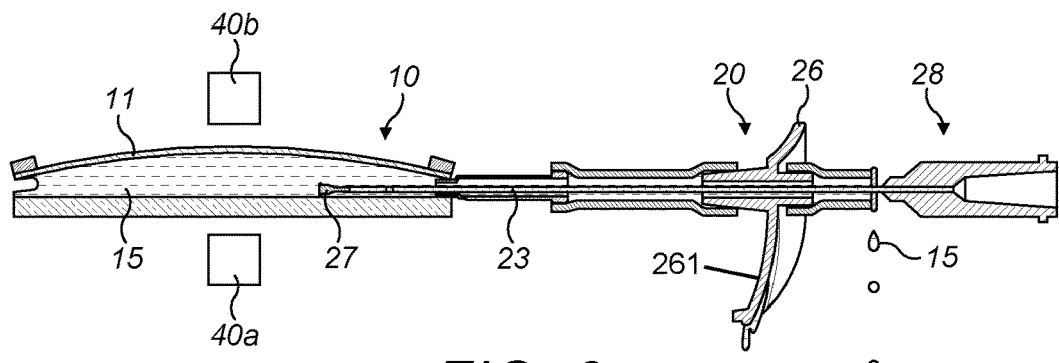
FIG. 6c shows the lens and fill port assembly arranged horizontally in a lens meter.

FIG. 6b shows the lens assembly 10 and fill port assembly 20 towards the end of the fluid filling process when both the lens assembly 10 and fill port assembly 20 are full of fluid 15. Fluid 15 can be seen spilling out of the upper silicone rubber tube 22b of the fill port assembly and onto the overflow part 26. The lip feature 261 of the overflow part 26 acts as an umbrella to shield the lens assembly 10 that is disposed beneath the fill port assembly 20 from the overflowing fluid 15. The coaxial space 30 between the needle 23 and interior wall of the fill port 21 restricts the flow of the viscous fluid 15 out of the lens enclosure 16 when the enclosure 16 has been filled so that, depending on the geometry of the lens assembly 10 and fill port assembly 20, the viscosity of the fluid 15 and the volumetric flow rate into the lens enclosure 16, there is a dynamic pressure in the lens assembly 10 in addition to the hydrostatic pressure owing to the head of fluid 15 from the lens assembly 10 to the top of the second silicone tube 22b. These dynamic and hydrostatic pressures sum to cause the membrane 11 to distend outwardly as shown in FIG. 6b. The optical strength of the membrane 11 is thus determined in part by the volume of fluid 15 within the lens enclosure 16 and the distension of the membrane 11. To obtain a specified target initial optical strength of the membrane 11, the process requires the lens assembly 10 to be overfilled with fluid, as discussed in more detail below. By way of example and without limitation, if the ultimate target membrane power were, for example, 0.5 dioptres (with the lens assembly uncompressed), the lens assembly 10 might be filled at the point as shown in FIGS. 6b and 6c to give a membrane power of 2 dioptres. However, the desired initial power of the membrane when the lens is sealed might be 1 dioptre to allow for additional fluid loss by absorption into the membrane.

The next step in the filling process of the present embodiment involves stopping the supply of fluid 15 to the enclosure 16 by closing the valve 54, removing the male Luer fitting 55 of the fluid line 53 from the needle subassembly 28 and removing the lens assembly 10 and fill port assembly 20 from the vacuum fill chamber 52. The lens assembly 10 and fill port assembly 20 are then placed on their sides in a lens meter 40a, 40b with the optical axis oriented vertically, as shown in FIG. 6c, so that the optical power of the membrane can be determined and the initial optical power of the lens assembly 10 can be set. A jig (not shown) may be provided to hold the lens assembly 10 centrally and horizontally on the lens meter 40a, 40b. The through-lens optical power is measured by the lens meter 40a, 40b as excess fluid 15 is forcibly discharged from the lens assembly 10 under pressure from the distended membrane 11. If the curvature of the hard lens 14 is known then the optical power of the membrane may be determined from the through-lens power as measured by the lens meter. Alternatively a direct method of measuring the membrane power may be used, such as lens meter operating in reflection mode, or a laser scanner measuring the profile of the membrane. An example of the former includes the OptiCentric® system from Trioptics. An example of the latter includes the LJ-V7000 series from Keyence (UK) Ltd., Avebury House, 219-225 Avebury Boulevard, Milton Keynes MK9 1AU.

Figure 6D:
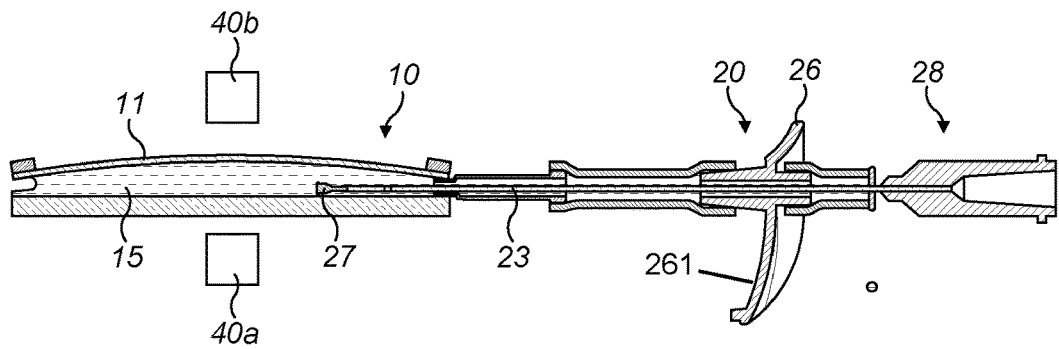
FIG. 6d shows the lens and fill port assembly of FIG. 6c with less fluid in the lens.

As the fill port assembly 20 continues to leak fluid 15, the optical power of the lens assembly 10 becomes progressively less positive and the target power is approached. FIG. 6d shows the arrangement of FIG. 6c at a later time where fluid 15 has leaked from the lens assembly 10 to the extent that the membrane 11 has a lower positive curvature than in FIG. 6c. As this happens, the membrane power is monitored directly or indirectly in real time to determine when the lens assembly 10 should be sealed to prevent further loss of fluid 15 from the enclosure 16. In FIG. 6d, the membrane has reached the desired initial fill power of 1 dioptre and the process of sealing the lens then begins.

Figure 6E:
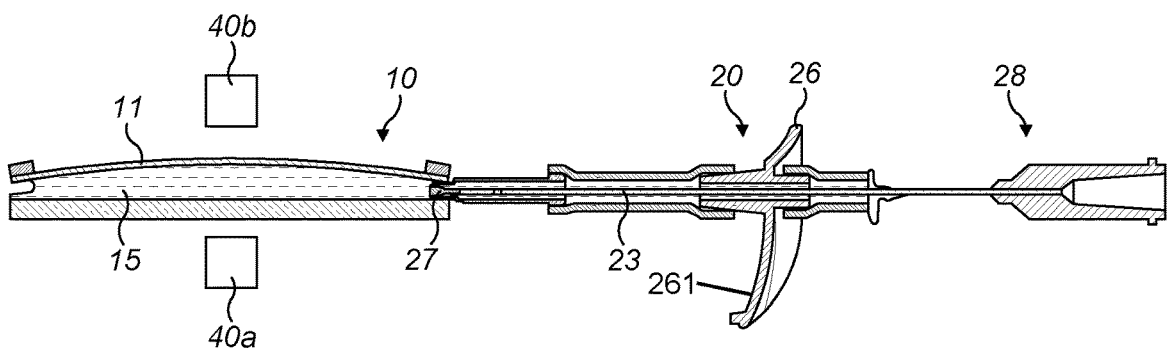
FIG. 6e is a schematic diagram of the lens and fill port assembly of FIGS. 6C and 6D illustrating the bunging process according to an embodiment of the invention.
Figure 6F:
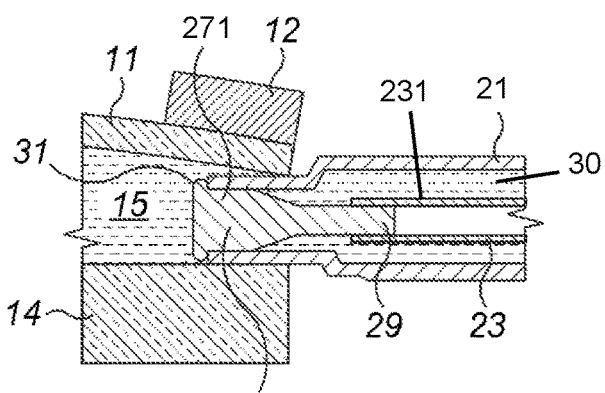
FIG. 6f is an enlarged view of part of the lens and fill port assembly of FIG. 6e which shows a bung member sealing an inlet port during the bunging process.
Figure 6G:
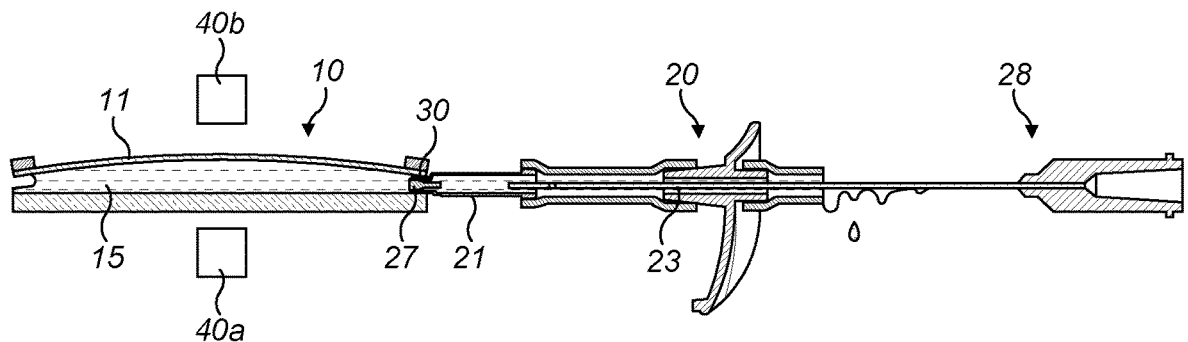
FIG. 6g is a schematic diagram corresponding to FIG. 6e in which a hollow needle used for filling the enclosure is being withdrawn from the fill port assembly.

FIGS. 6e to 6g show a process used to seal the correct volume of fluid 15 in the lens assembly 10. When the desired initial optical power of the membrane 11 is reached, the fill needle subassembly 28 is withdrawn from the fill port assembly 20, pulling the compliant bung 27 into the distal end of the fill port 21 where it forms an interference fit with the interior surface of the fill port 21, as shown in FIG. 6e and in more detail in FIG. 6f. As the bung 27 is pulled into the fill port 21, the lip feature 31 on the bung 27, which has a diameter that is larger than an inner diameter of the fill port 21, abuts the distal end of the fill port 21 and prevents the bung 27 from being pulled completely into the fill port 21. As the needle subassembly 28 is withdrawn further through the fill port assembly 21, the tail section 29 of the bung 27 is pulled out of the distal end 231 of the needle 23 as the bung 27 resists being pulled further into the fill port 21, as can be seen in FIG. 6g. The bung 27 therefore remains in place within the fill port 21 and seals the fluid 15 within the enclosure 16 of the lens assembly 10. The bung 27 is held in place within the fill port 21 partly as a result of the positive hydrostatic pressure of the fluid 15 within the enclosure 16.

Figure 6H:
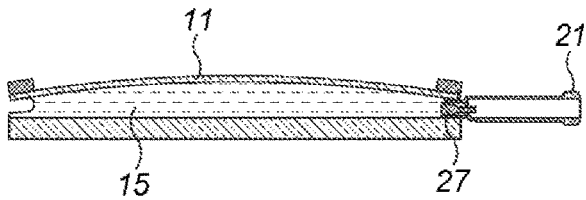
FIG. 6h shows the lens assembly of FIG. 6g with the bung and fill port still in place after the remainder of the fill port assembly has been removed.
Figure 6I:
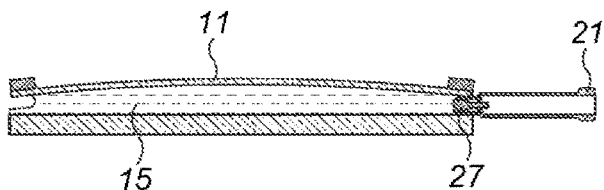
FIG. 6i shows the bunged adjustable lens assembly of FIG. 6h after the membrane has become saturated with the fluid.

FIG. 6h shows the bunged lens assembly 10 immediately after bunging with only the fill port 21 and bung 27 still in place. The remainder of the fill port assembly 20 has been removed, along with the needle subassembly 28. In this example the power of the membrane is still at the desired initial fill power of 1 dioptre. FIG. 6i shows the arrangement of FIG. 6h at a later time, after the membrane 11 has become saturated with the fluid 15. Note the lower curvature of the membrane 11 in FIG. 6i as compared to FIG. 6h. In FIG. 6i the level of fluid within the lens assembly 10 has reduced to the point where the power of the membrane 11 has reached the ultimate stable target membrane power of 0.5 dioptres. While in this embodiment the lens assembly 10 has been left at room temperature for the membrane to become saturated with fluid, it is noted that this process could alternatively be accelerated using an elevated temperature as set out in WO 2017/055787 A2, which is incorporated herein by reference.

Figure 6J:
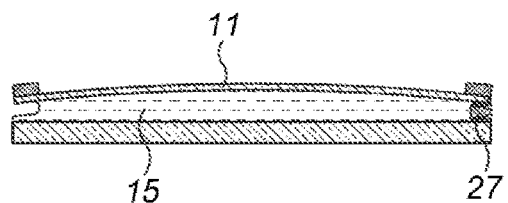
FIG. 6j shows the adjustable lens assembly of FIG. 6i with the distal end portion of the bung and fill port trimmed off to leave only the bunged inlet portion in place.

Finally, the portion of the fill port 21 and tail section 29 of the bung 27 projecting from the side of the lens assembly 10 are removed to leave the lens assembly 10 as shown in FIG. 6j. This step may be completed with, for example, cutting pliers, an ultrasonic knife, a laser or any other means known in the art.

Example 2

In a second embodiment of the invention, shown in FIGS. 7a-7f, the lens enclosure 16 is filled with fluid via a non-return valve 131 that is let into the collapsible side wall 13 of the lens assembly 10 and secured in place with adhesive or in some other way. In alternative embodiments, a non-return valve 131 may be integrally formed with side wall 13. The non-return valve 131 may be lily- or trumpet-like in shape such that fluid pressure in the enclosure 16 closes the valve, but will be understood that the precise shape is not important. The position of the non-return valve 131 may advantageously be chosen to be at a point with minimal movement of support ring 12 to and from hard lens 14, such as proximate a static control point (not shown). However, in some embodiments the position of the non-return valve 131 may be suitably chosen to be in a region where there are no static control points, for example.

Figure 7A:
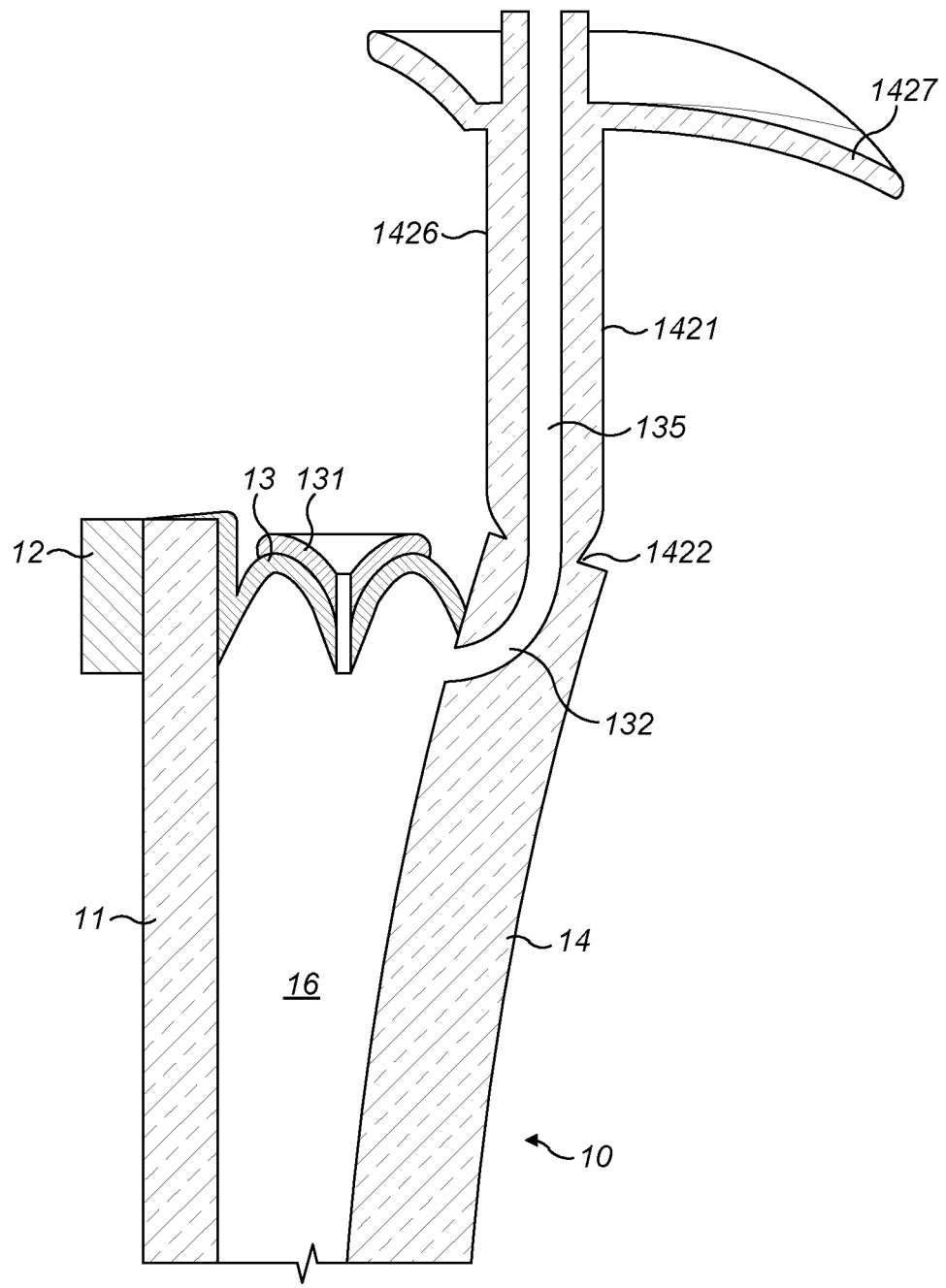
FIG. 7a is a schematic cross-sectional diagram of an injection port assembly according to a second embodiment of the invention.

As can be seen in FIG. 7a, a channel 132 is formed in the hard lens 14 which is in fluid communication with an interior passageway 135 formed in an overflow part 1421 which is attached to the hard lens 14. The lens enclosure 16 is therefore in fluid communication with the vacuum space 60 via the channel 132 and passageway 135 of the hard lens 14 and overflow part 1421. The overflow part 1421 has a substantially cylindrical body portion 1426 that projects outwardly from an outer peripheral side of the hard lens 14 and is connected to the hard lens 14 by snap off feature 1422 which comprises a weakened, frangible zone where the cylindrical body portion 1426 has a locally reduced diameter. In the drawings, the overflow part 1421 is shown as being integrally formed with and made of the same material as hard lens 14. However, it may be co-moulded, or it may be made separately and attached in some other way. Similarly to the overflow part 26 of the first embodiment of the invention, the overflow part 1421 of the present embodiment comprises a circumferential lip feature 1427 proximate a proximal end that projects from the outer surface of the body portion 1426 to provide a barrier which prevents fluid from spilling onto the lens assembly 10 should the lens assembly 10 overflow during filling and trimming.

Figure 7B:
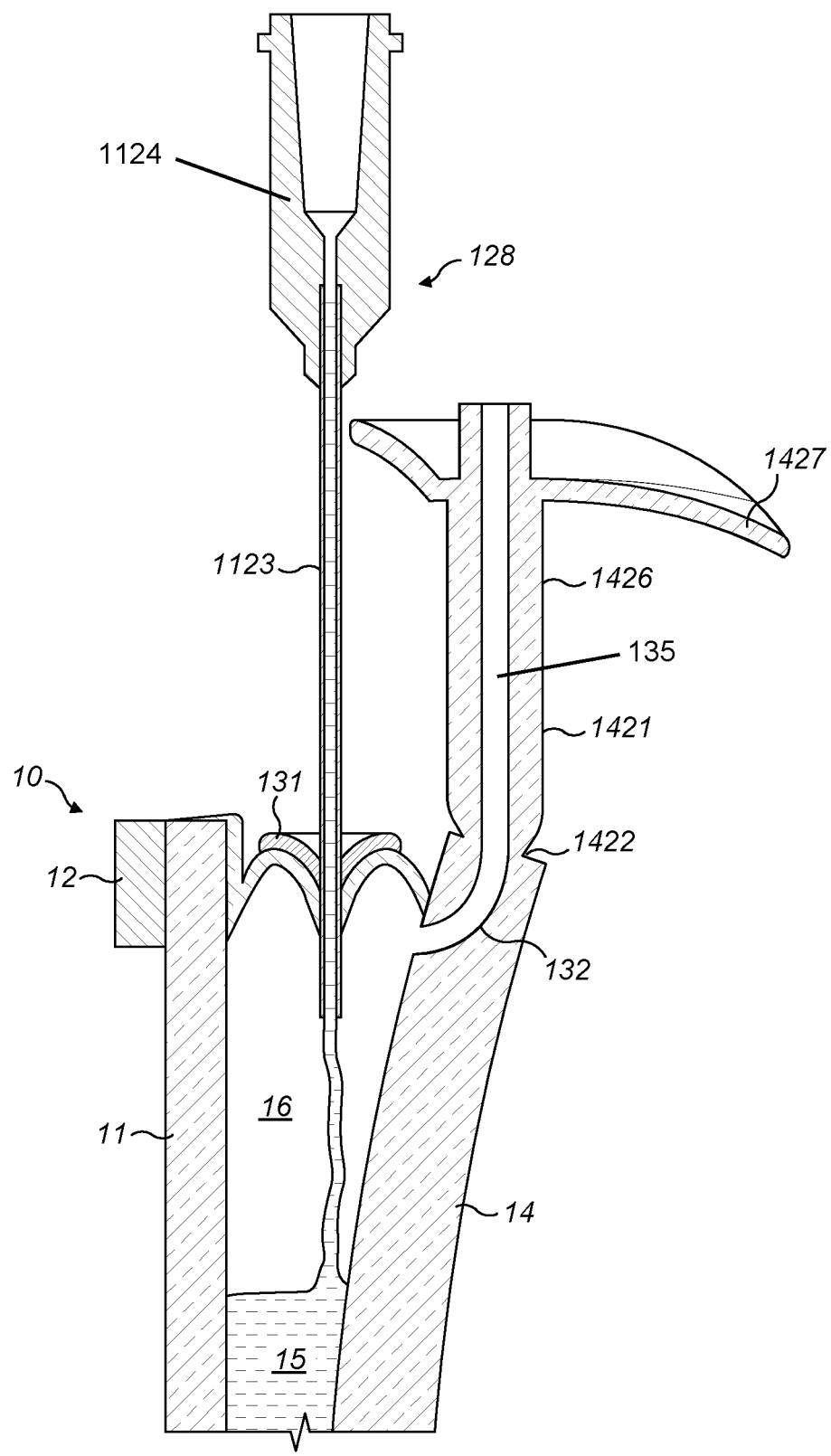
FIG. 7b corresponds to the schematic cross-sectional diagram of FIG. 7a during the filling process with fluid being provided to the enclosure via a fill needle subassembly.

Filling of the lens takes place in substantially the same way as already described and shown in FIG. 5, with the z-axis of the lens assembly 10 oriented substantially horizontally and overflow part 1421 extending vertically. The main difference being, in this embodiment, that the male Luer fitting 55 connects instead to a needle subassembly 128 comprising hypodermic-type fill needle 1123 and proximal female Luer fitting 1124. To fill the lens assembly 10, the non-return valve 131 in the side wall 13 is pierced by the needle 1123 and fluid 15 is pumped into the enclosure 16, as shown in FIG. 7b using a fluid pump as described above. As the lens enclosure 16 fills with fluid 15, the displaced air escapes via the channel 132 and passageway 135 of the hard lens 14 and overflow part 1421. It is again noted that for clarity purposes, the vacuum chamber 52, fluid line 53 and fluid pump 43 are omitted from FIG. 7b.

Figure 7C:
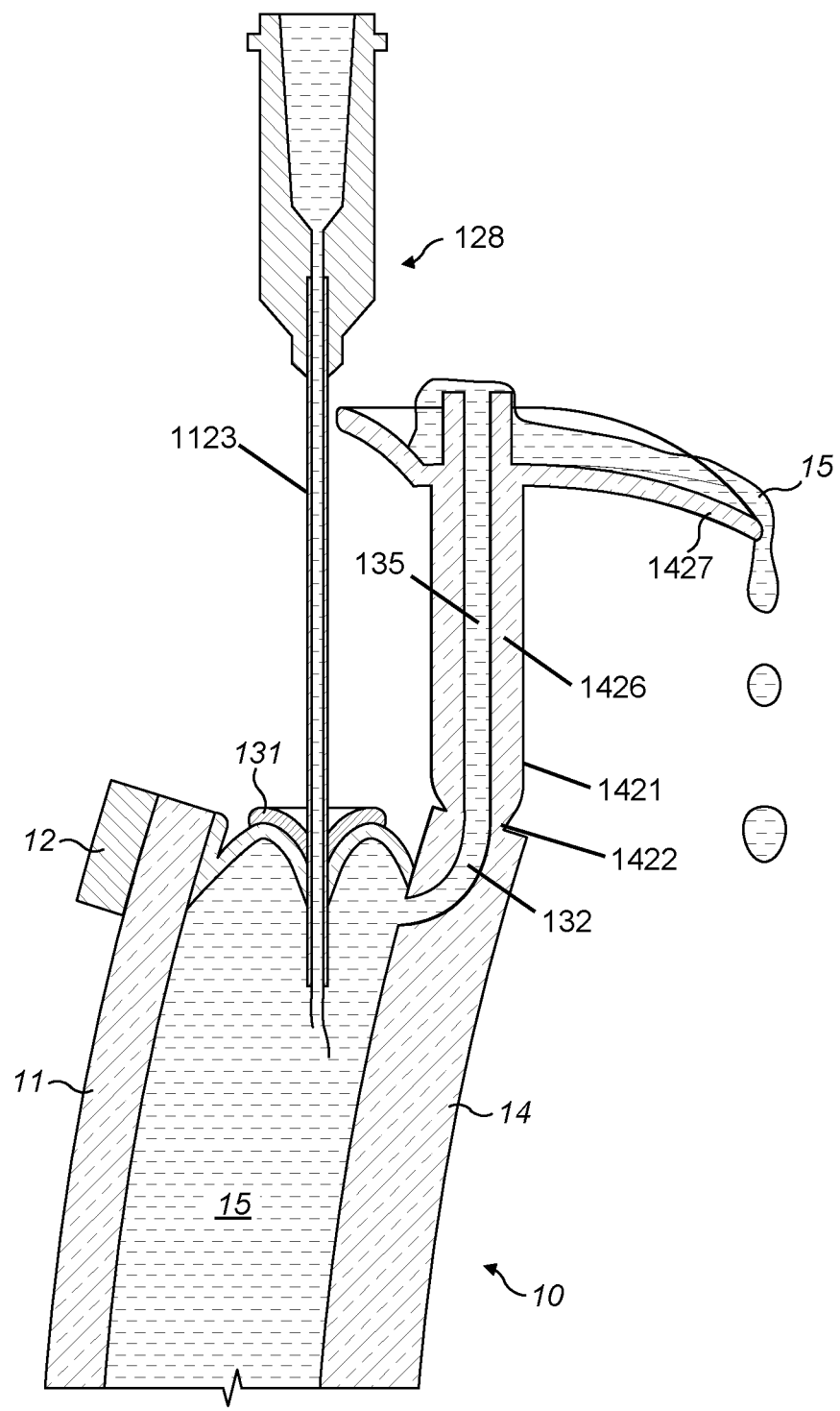
FIG. 7c corresponds to the schematic cross-sectional diagram of FIG. 7b at a later time during the filling process wherein the enclosure has been overfilled and excess fluid is spilling out of the overflow part.

As described with the first embodiment of the invention (Example 1), the present method of filling the lens assembly 10 also requires the lens assembly 10 to be overfilled with fluid in order to obtain a specified target initial optical power of the membrane 11. FIG. 7c shows the lens assembly 10 as overfilled and wherein fluid 15 is being pushed out of the lens assembly 10 under the pressure the distended membrane 11 via the channel 132 and passageway 135 of the hard lens 14 and overflow part 1421. As can be seen, when the lens assembly 10 overfills, the lip feature 1427 of the overflow part 1421 acts as an umbrella, or shield, and prevents the overflowing fluid 15 from dripping onto the lens assembly 10 positioned below the overflow part 1421 by diverting the fluid laterally away from the lens assembly 10.

Figure 7D:
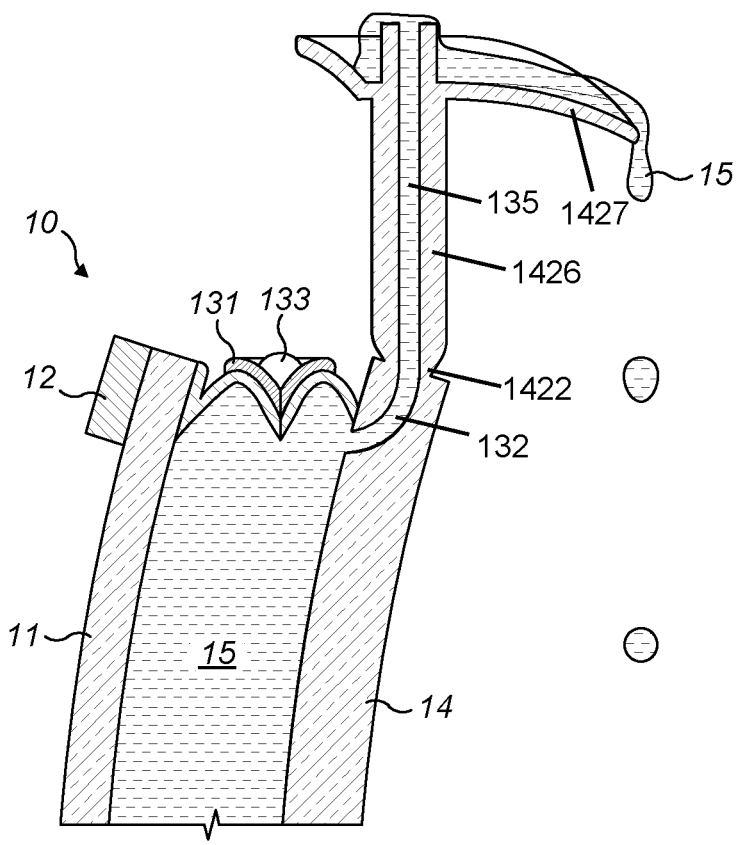
FIG. 7d corresponds to the schematic cross-sectional diagram of FIG. 7c at a later time during the filling process wherein the fill needle subassembly has been removed and wherein the non-return valve in the side-wall of the adjustable lens assembly has been sealed using an adhesive.

When the desired amount of fluid has been admitted into to the enclosure 16, the needle 1123 is withdrawn from the side wall 13 and non-return valve 131 and the pressure of the fluid within the lens closes the non-return valve 131. However, to ensure a robust seal throughout the life of the product the non-return valve can be sealed using a drop of adhesive 133, as shown in FIG. 7d.

Figure 7E:
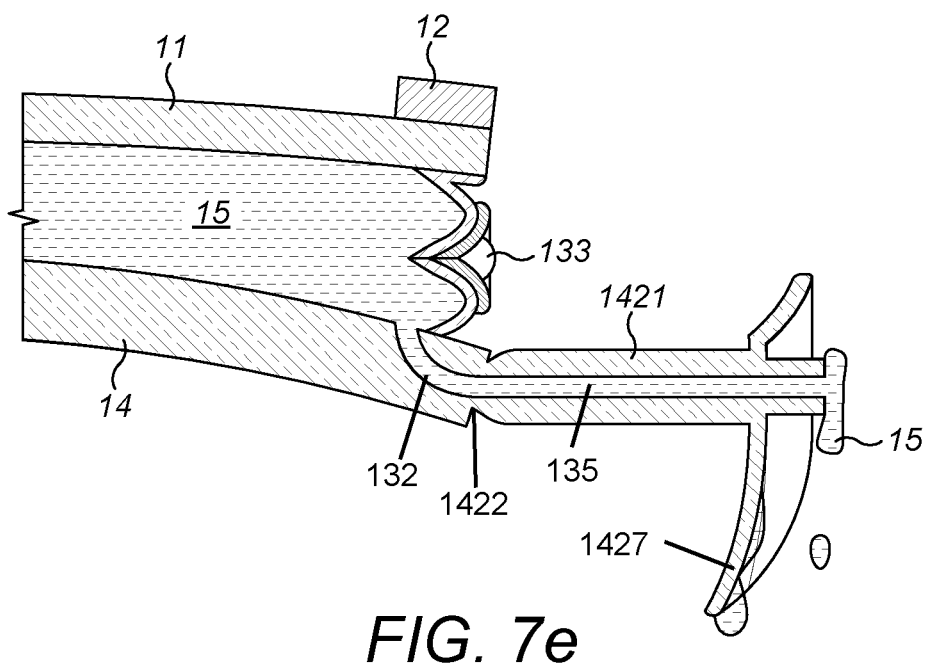
FIG. 7e corresponds to the schematic cross-sectional diagram of FIG. 7d at a later time during the filling process wherein the adjustable lens assembly has been placed horizontally on a lens meter (not shown).
Figure 7F:
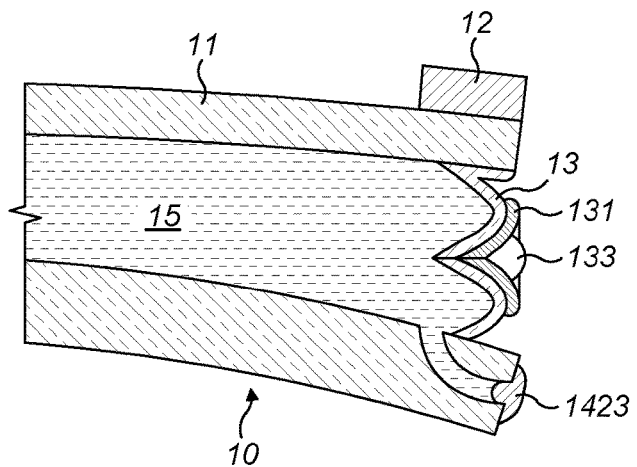
FIG. 7f corresponds to the schematic cross-sectional diagram of FIG. 7e after the enclosure has been sealed by snapping-off the overflow part from the hard lens and sealing the passageway in the hard lens.
Figure 7G:
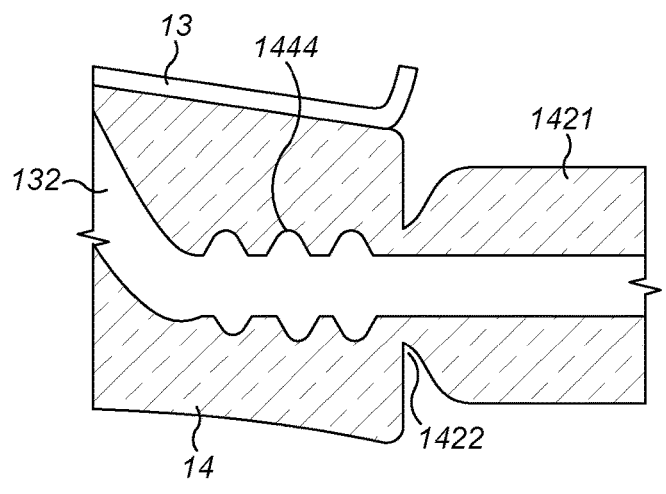
FIG. 7g is a schematic cross-sectional view of an alternative embodiment to that shown in FIG. 7f in which a thread is provided in the channel of the hard lens.
Figure 7H:
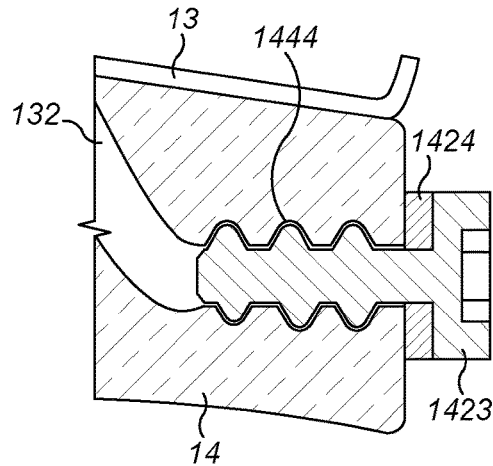
FIG. 7h corresponds to the schematic cross-sectional diagram of FIG. 7g after the enclosure has been sealed by screwing a threaded bolt into the threaded channel.

FIG. 7e shows the arrangement once the lens assembly 10 has been removed from the vacuum chamber, the adhesive has been applied to the non-return valve, and the lens assembly 10 has been placed on a lens meter (not shown). In this state the optical power of the membrane 11 becomes steadily less positive as excess fluid 15 is pushed out of the lens via the channel 132 and passageway 135 of the hard lens 14 and overflow part 1421 under the positive pressure of the fluid 15 within the enclosure 16. As with the first embodiment of the invention, the lens assembly 10 is sealed once the membrane 11 reduces to a predetermined initial optical strength. Again, if the ultimate target membrane 11 power were, for example, 0.5 dioptres, the predetermined initial power of the membrane 11 when the lens assembly 10 is sealed might be 1 dioptre. In order to seal the enclosure 16, the overflow part 1421 is snapped off from the hard lens 14 at the snap off feature 1422 and a seal 1423 is applied to cover-over the opening of the channel 132, as shown in FIG. 7f. The seal 1423 may be an adhesive, a polymer part that is ultrasonically welded to hard lens 14 or some other seal or plug. Alternatively, a thread 1444 may be provided in the channel 132 of the hard lens, as shown in FIG. 7g and the seal 1423 may be a threaded bolt or screw with a gasket or washer 1424, as shown in FIG. 7h.

Example 3

Figure 8:
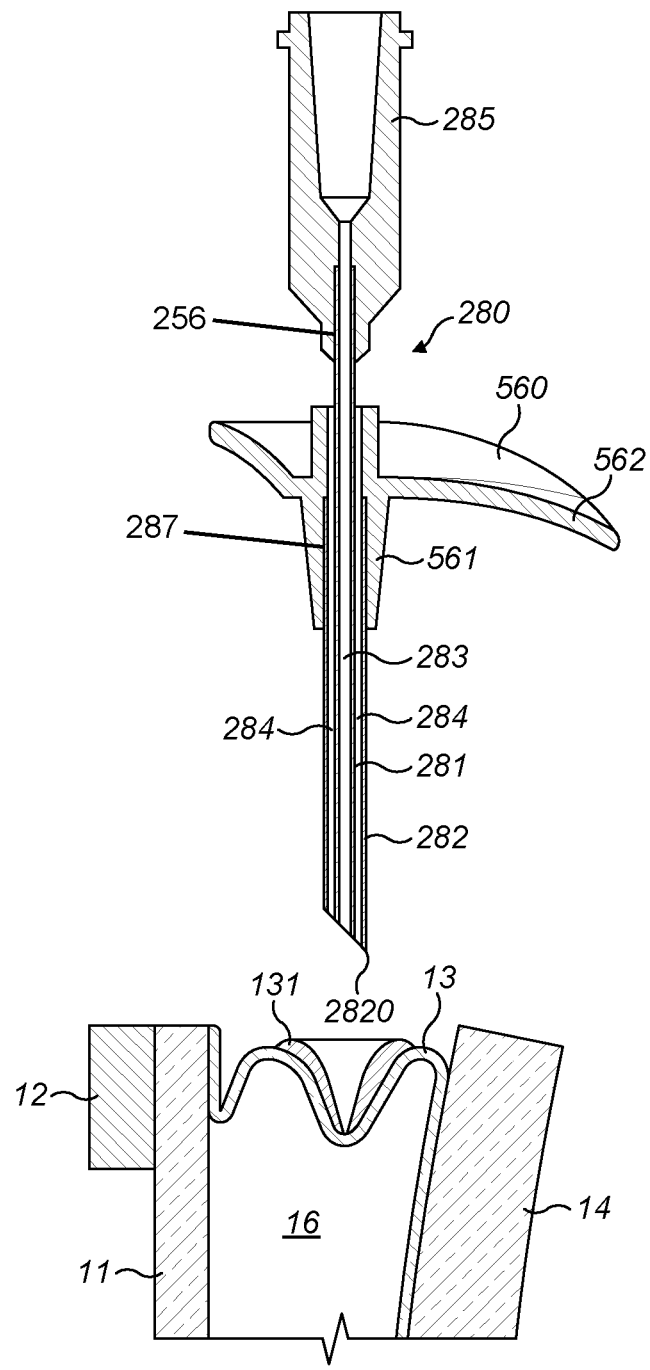
FIG. 8 is a schematic cross-sectional diagram of an injection port assembly according to a third embodiment of the invention.
Figure 9A:
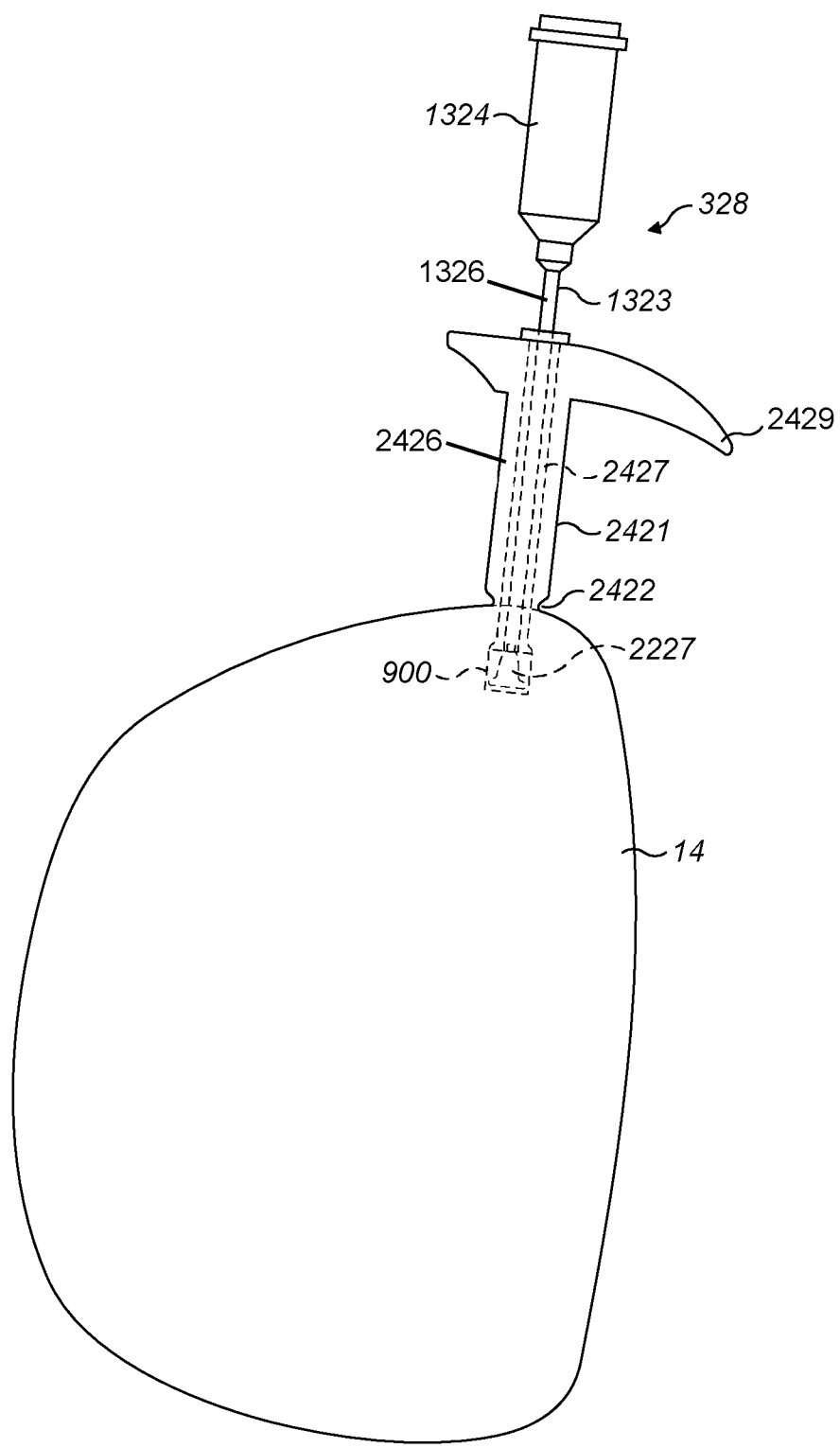
FIG. 9a shows a schematic front view of an adjustable lens and fill port assembly according to a fourth embodiment of the invention.
Figure 9B:
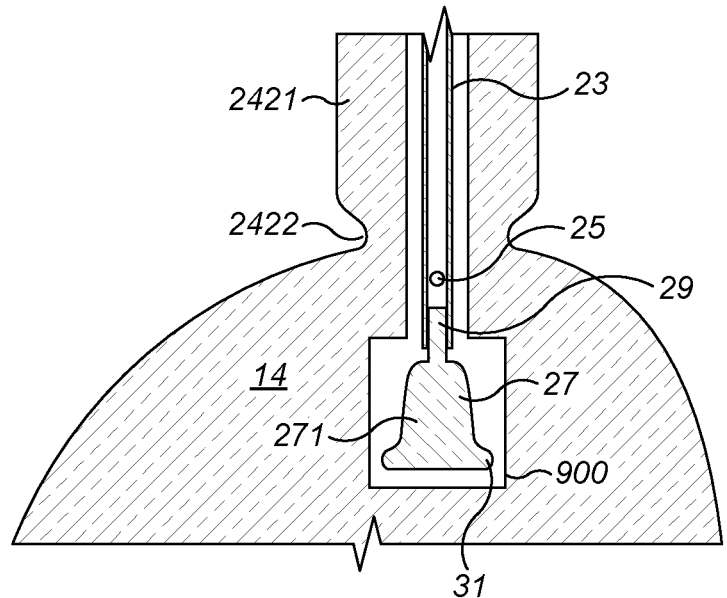
FIG. 9b is a detailed cross-sectional front view of the adjustable lens and fill port assembly of FIG. 9a showing a bung in place in the distal end of the needle and within the chamber of the hard lens.
Figure 9C:
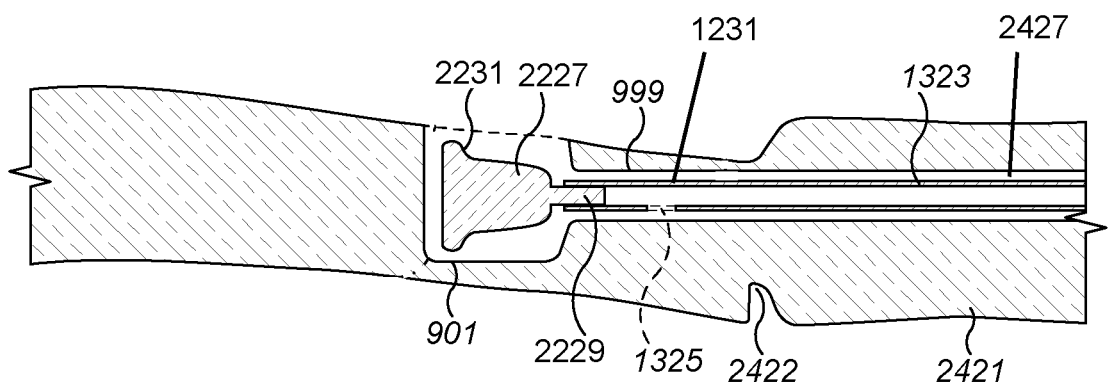
FIG. 9c is a detailed cross-sectional view of the adjustable lens and fill port assembly that corresponds to a side-view of the region shown in FIG. 9b and wherein the support ring, membrane and side wall have been omitted.
Figure 9D:
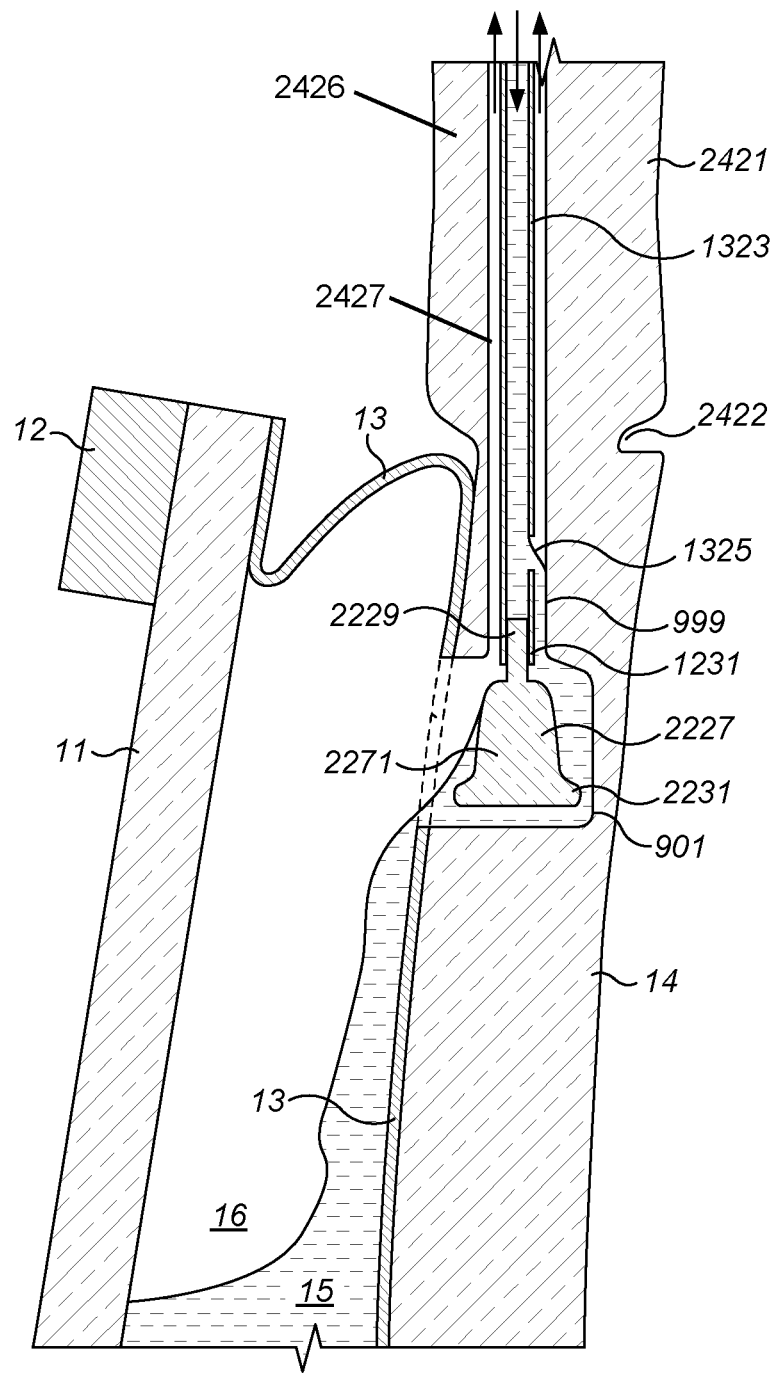
FIG. 9d corresponds to the detailed cross-sectional view of FIG. 9c with the support ring, membrane and side wall shown and wherein the enclosure is being filled with fluid.

The lens assembly 10 of a third embodiment of the invention is similar to that of Example 2 above, except that there is no internal channel 132 in the hard lens 14. The lens assembly 10 comprises a non-return valve 131 formed or fitted in the side wall 13 of the lens assembly 10 that is similar to the non-return valve 131 described above for the second embodiment of the invention, as can be seen in FIG. 8. In this case the lens assembly 10 is filled using a needle subassembly 280 comprising coaxial needles 281, 282, with an inner needle 281 providing a fill path 283 for the fluid and an outer needle 282 providing a coaxial fluid exit path 284. Outer needle 282 has sharp hypodermic-type end 2820 for puncturing the non-return valve 131. An overflow part 560 comprising a substantially tubular main body 561 is fitted coaxially to a proximal end 287 of the outer needle 282. A proximal end 256 of the inner needle protrudes proximally of the proximal end 287 of the outer needle and is fitted with a female Luer fitting 285. The overflow part 560 is positioned such that when the lens enclosure 16 is over-filled, excess fluid exits from the exit path 284 at the side of the overflow part 560 that is furthest from the lens assembly 10 when the lens assembly 10 is being filled. As described above the sectional area of the exit path 284 is sized to restrict the flow of the fluid 15 from the enclosure 16, to moderate the speed with which the membrane 11 collapses, thereby allowing the progressive decrease in its optical power to be monitored and stopped at the appropriate time. The overflow part 560 comprises a lip feature 562 that is attached to the proximal end 287 of the outer needle and projects circumferentially from the outer surface of the main body 561 so that when excess fluid 15 is pushed out of the enclosure 16 via the fluid exit path 284, the lip feature 562 acts as an umbrella to shield the lens assembly 10 below the lip feature 562 from overflowing fluid 15 as described above. When the desired amount of fluid 15 has been provided to the enclosure 16, the needle subassembly 280 is withdrawn from the side wall 13 and non-return valve 131, and the pressure of the fluid within the lens closes the non-return valve 131. As with the second embodiment of the invention, the non-return valve 131 can be sealed using an adhesive to ensure a robust seal throughout the life of the product.

Example 4

FIGS. 9a to d show another fill port arrangement in accordance with the invention, which comprises an overflow part 2421 that is integrated with a hard lens 14. The overflow part 2421 has a substantially cylindrical main body 2426 that projects radially outwardly from an outer peripheral side of the hard lens 14 and is connected to the hard lens 14 by snap off feature 2422 which comprises a weakened zone where the cylindrical body portion 2426 has a locally reduced diameter. In the drawings, the overflow part 2421 is shown as being integrally formed with and made of the same material as hard lens 14. However, it may be co-moulded, or it may be made separately and attached in some other way. Similarly to the overflow parts described above, the overflow part 2421 comprises a lip feature 2429 that projects circumferentially from the outer surface of the body portion 2426 proximate a proximal end to provide a barrier which prevents fluid from coming into contact with the lens assembly 10 when the lens assembly 10 is overfilled in accordance with the invention. Suitably, the lip feature 2429 includes a spout to direct the flow of excess fluid 15 away from the lens assembly 10 during filling.

A needle subassembly 328 of this fourth embodiment of the invention comprises a female Luer fitting 1324 attached to proximal end 1326 of a hollow needle 1323 defining a side hole 1325 near a distal end 1231 of the needle 1323 and, during the filling process, a bung 2227 lodged in the distal end 1231 of the needle 1323. As with the first embodiment of the invention described above in Example 1, the needle subassembly 323 is configured to fill the lens assembly 10 via the side hole 1325 of the needle 1323 while the distal end 1231 of the needle 1323 is wholly or partly occluded by a bung 2227.

The body portion 2426 of the overflow part 2421 comprises an interior passageway 2427 configured such that the needle 1323 of the needle subassembly 328 can pass longitudinally through the body portion 2426 to provide fluid 15 to the lens assembly 10. As can be best seen in FIGS. 9b to 9d, the interior passageway 2427 of the overflow part connects with an internal channel that is formed in the hard lens 14. At its distal end, away from the overflow portion, the internal channel has a first, relatively wide channel section 901 that opens into the enclosure 16. A second, relatively narrow channel section 999, proximate the distal end portion of the body portion 2426 of the overflow part 2421, connects the wide channel section 901 of the internal channel of the hard lens 14 with of the interior passageway 2427 of the overflow part 2421. The lens assembly 10 is thereby configured such that the needle 1323 can be passed through the overflow part 2421 and the distal end 1231 of the needle 1323 moved into the wide channel section 901 of the internal channel of the hard lens 14.

Prior to the filling process, the distal end 1231 of the needle 1323 is plugged with the compliant bell-shaped bung 2227 that is housed within the wide channel section 901 of the internal channel of the hard lens 14. The bung 2227 has a body section 2271 having a first diameter along a first distal cylindrical length and a tail section 2229 having a second, smaller diameter along a second, proximal cylindrical length. The tail section 2229 of the bung 2227 is releasably secured in the distal end 1231 of the needle 1323 by an interference fit between an inside surface of needle 1323 and tail section 2229 so that the body section 2271 projects from the distal end 1231 of the needle 1323. At the distal end of the body section 2271, the bung 2227 comprises a circumferential lip feature 2231, or other formation of increased radial dimension, that projects circumferentially from the outer surface of the bung 2227 as described above.

When the desired fill power of the membrane 11 is reached during the filling process, the fill needle subassembly 328 is withdrawn proximally from the hard lens 14 into the overflow part 2421, pulling the compliant bung 2227 into the narrow channel section 999 of the internal channel of the hard lens 14 where it forms an interference fit with a cylindrical interior surface of the narrow channel section 999. As the bung 2227 is pulled into the narrow channel section 999, the lip feature 2231 of the bung 2227, which has a diameter that is larger than the narrow channel section 999, abuts the wall of the wide channel section 901 at an entrance to the narrow channel section 999 and prevents the bung 2227 from being pulled further into the narrow channel section 999. As the needle subassembly 328 is withdrawn further from the hard lens 14, the tail section 2229 of the bung 2227 is pulled out of the distal end 1231 of the needle 1323 as the bung 2227 resists being pulled further narrow channel section 999.

As with the previously described embodiments of the invention, the lens assembly 10 of the present embodiment is sealed once the curvature of the membrane 11 reduces to an appropriate initial optical strength. In order to seal the enclosure, the overflow part 2421 is snapped-off from the hard lens 14 at the snap-off feature 2422 and a seal is applied to cover-over the opening of the narrow channel section 999. The seal may be as already described for the second embodiment of the invention.

Example 5

Figure 10:
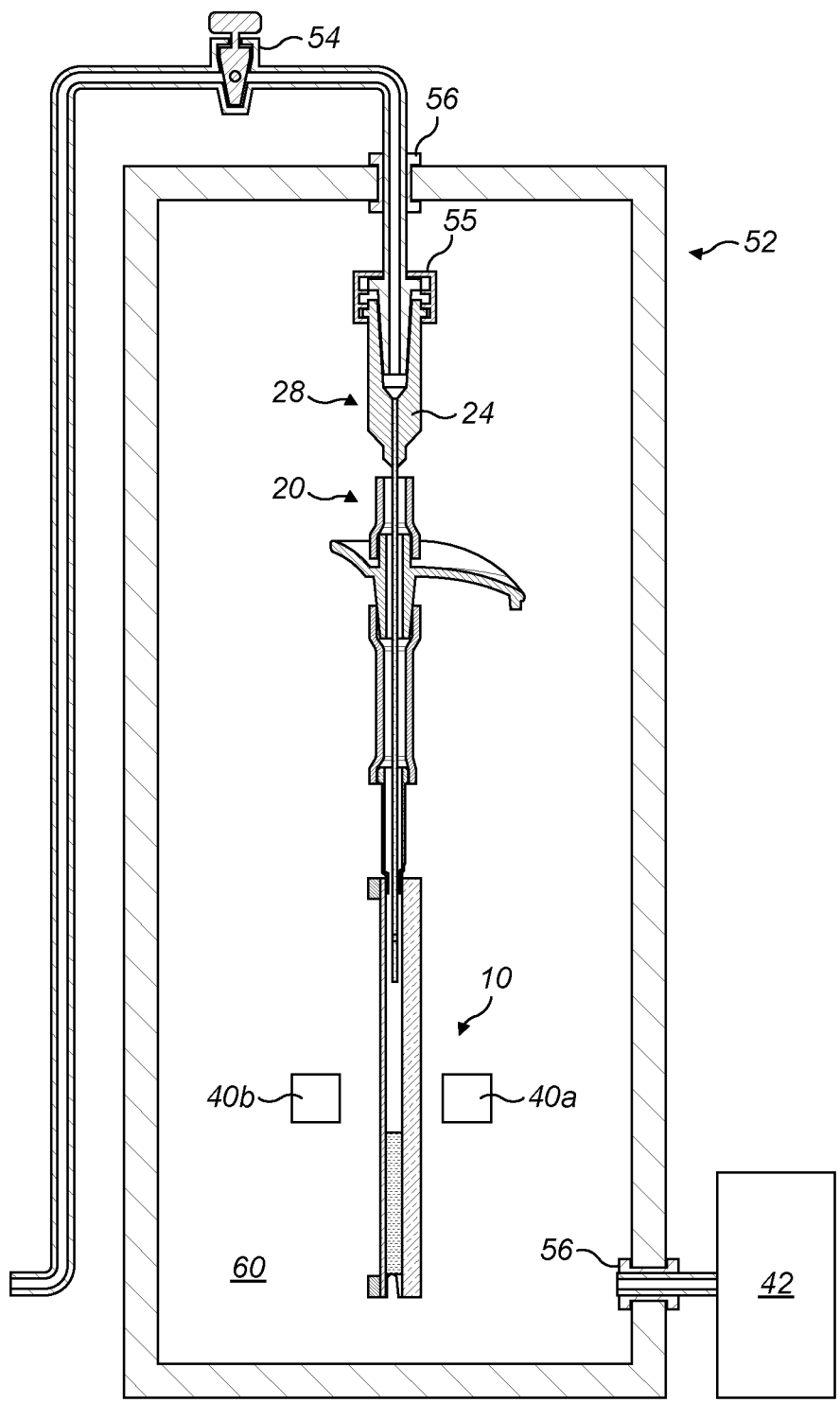
FIG. 10 is a schematic diagram of a filling system alternative to FIG. 5 wherein a lens meter or equivalent device is contained within the filling vacuum chamber.

A further embodiment of the present invention is illustrated in FIG. 10. The apparatus is similar to that as shown and described with reference to FIG. 5. However, in this case the lens meter 40*a*, 40*b* or equivalent device is contained within the filling vacuum chamber 52 so that the lens assembly 10 may be sealed immediately once the target initial optical power is reached, without first having to remove the lens assembly from the vacuum chamber 52. This embodiment of the invention may be used in conjunction with any of the already described embodiments of the invention.

Overview of the Build Processes

Figure 11:
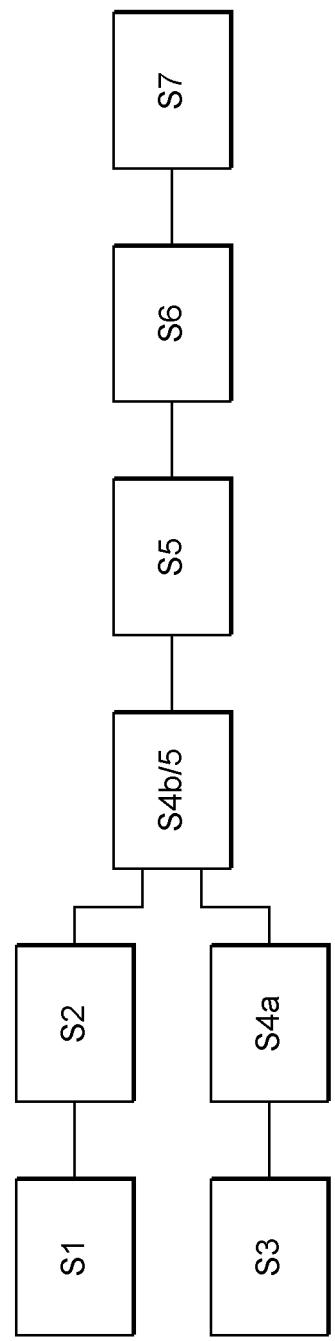
FIG. 11 is a block diagram of a sequence of build processes for making an adjustable fluid-filled lens assembly in accordance with the present invention.

FIG. 11 shows a block diagram by way of work stations (numbered S1, S2 and so on) of some of the build processes to make a compression-type fluid-filled lens assembly of the kind disclosed by WO 2013/1144592 A1, for example. Suitable methods of manufacturing compression-type fluid-filled lenses are also disclosed in WO 2017/055787 A2. In summary the work stations are as follows:

S1: The membrane 11 is tensioned.
S2: The support structure (in the examples described above a resiliently bendable support ring 12) is built onto the tensioned membrane 11.
S3: The hard lens 14 is laminated onto the side wall 13.
S4*a*: This is an alternative to S3 for when lens construction is as shown in FIG. 4D. The separate rear wall that extends from side wall 13 is bonded to the front surface 141 of the hard lens 14
S4*b*/5: joining of hard lens 14 and sidewall 13 with membrane 11 and support ring 12, and, where used, with fill port 20.
S5: laser trim and rear lens 14 setting.
S6: Filling of lens assembly 10 with fluid in accordance with the present invention.
S7 optical measurement.

The invention claimed is:

1. A method of filling an envelope of a compression-type adjustable optical device, such as a liquid lens or mirror, which is formed in part by a distensible membrane having an exterior optical surface, with a substantially incompressible fluid to a predetermined optical power or radius of curvature; the method comprising pumping fluid into the envelope under vacuum through a fluid supply conduit in fluid communication with an interior of the envelope while allowing air to escape from the envelope through a fluid overflow conduit in fluid communication with the interior of the envelope; continuing to pump fluid into the envelope to cause the membrane to distend to an optical power of the optical device which is greater than the predetermined optical power while allowing excess fluid to escape from the envelope through the overflow conduit; slowing or stopping the supply of fluid to the envelope, thereby to allow the membrane progressively to relax and monitoring the optical power of the optical device until it falls to the predetermined optical power; removing the fluid supply conduit and fluid overflow conduit; and thereafter sealing the envelope.

2. The method of claim 1, wherein the fluid overflow conduit comprises an elongate body portion having an inlet portion at a distal end and an outlet portion at a proximal end and defining an interior passageway that extends between a fluid inlet in the inlet portion and a fluid outlet in the outlet portion; the inlet portion being connected to the optical device during filling.

3. The method of claim 2, wherein the optical device and fluid overflow conduit are connected and arranged during filling such that the body portion extends vertically away from the optical device.

4. The method of claim 3, wherein the body portion further comprises a deflector portion which is disposed exteriorly of the body portion intermediate the distal end and the proximal end; the deflector portion being shaped to deflect fluid exiting from the fluid outlet away from the optical device.

5. The method of claim 2, wherein the fluid supply conduit comprises a hollow tube which extends longitudinally in the interior passageway of the body portion; the interior of the hollow tube constituting the fluid supply conduit and a peripheral region of the interior passageway surrounding the tube constituting the fluid overflow conduit.

6. The method of claim 5, wherein the hollow tube has a distal end portion which releasably carries a resilient bung member at a distal end thereof; the method comprising inserting the distal end portion through a port in the optical device for filling the envelope and sealing the envelope after filling by withdrawing the hollow tube from the optical device such that the bung member enters into and seals the port and detaches from the distal end of the hollow tube, thereby allowing the hollow tube to be removed.

7. The method of claim 6, wherein the port is formed by the inlet portion of the body portion which is connected to the optical device during filling.

8. The method of claim 6, wherein the port is formed in the optical device.

9. The method of claim 6, wherein the hollow tube comprises a hollow needle.

10. The method of claim 1, wherein the fluid overflow conduit is disposed within an overflow device which is separate from the fluid supply conduit; the overflow device being connected to the optical device during filling and removed after filling.

11. The method of claim 1, wherein the fluid supply conduit and the fluid overflow conduit are arranged coaxially with one another.

12. The method of claim 11, wherein the fluid supply conduit is disposed interiorly of the fluid overflow conduit.

13. The method of claim 1, wherein the optical device defines an optical axis; the method comprising holding the optical device with the optical axis oriented substantially horizontally during filling.

14. The method of claim 1, wherein the optical device is disposed within a vacuum chamber during filling under vacuum.

15. The method of claim 1, further comprising heating and/or degassing the fluid to being introduced into the envelope.

16. The method of claim 1, further comprising storing the fluid under vacuum prior to being introduced into the envelope.

17. An overflow device for use in filling an envelope of a compression-type adjustable optical device, such as a liquid lens or mirror, which is formed in part by a distensible membrane having an exterior optical surface, with a substantially incompressible fluid to a particular focal length or radius of curvature under vacuum; the overflow device comprising an elongate hollow body portion which has an inlet portion at a distal end defining a fluid inlet and an outlet portion at a proximal end defining a fluid outlet and defines an interior passageway forming a fluid overflow conduit between the fluid inlet and the fluid outlet, and a deflector portion which is disposed exteriorly of the body portion intermediate the inlet portion and outlet portion; wherein the inlet portion is adapted to be connected to the an interior of an envelope to be filled, and the deflector portion is shaped to deflect fluid flowing out of the fluid outlet away from the overflow device.

18. A wall component for a compression-type adjustable optical device having a fluid-filled envelope which is formed at least in part by a distensible membrane and an opposing inflexible wall which is formed by or supported by a wall component, the wall component comprising a hard member having a first surface which is configured to form or support the inflexible wall of the envelope of the optical device and being formed with an interior channel which opens onto the first surface of the hard member; and an overflow portion comprising an elongate hollow body portion having a distal end portion which can be removably attached to the hard member and a proximal end portion, and a deflector portion which is disposed exteriorly of the body portion intermediate the distal end portion and the proximal end portion; wherein the body portion defines an interior passageway forming a fluid overflow conduit that extends between the distal end portion of the body portion where it communicates with the interior channel in the hard member when attached and a fluid outlet defined by the proximal end portion of the body portion, the body portion extending away from the hard member; wherein excess fluid introduced into the envelope of the optical device during filling flows into the fluid overflow conduit provided by the interior passageway of the overflow portion from the interior channel formed in the hard member and out of the fluid outlet of the body portion; the deflector portion being shaped to deflect fluid exiting from the fluid outlet away from the overflow device.

19. A wall component and filling device for a compression-type adjustable optical device having a fluid-filled envelope which is formed at least in part by a distensible membrane and an opposing inflexible wall which is formed by or supported the wall component; wherein the filling device comprises a hollow tube forming a fluid supply conduit which is adapted for connection to a pumped supply of fluid and comprises a distal end portion having a bung-carrying portion at a distal end thereof and a fluid delivery orifice proximate the distal end, and a detachable bung member; and wherein the wall component comprises a hard member having a first surface which is configured to form or support the inflexible wall of the envelope and being formed with an interior channel which extends through the hard member between one end where it opens onto the first surface of the hard member and another end which is adapted to receive the distal end portion of the hollow tube; and wherein the interior channel comprises a first relatively wide section proximate the one end of the interior channel and a second relatively narrow section proximate the other end of the interior channel; the hollow tube is configured such that its distal end portion extends into the first relatively wide section of the interior channel when the hollow tube is inserted into the other end of the interior channel; the detachable bung member has a distal head portion which is dimensioned to form a tight fit in the second relatively narrow section of the interior channel and a proximal tail portion which is configured to engage releasably with the bung-carrying portion at the distal end of the hollow tube; and the hollow tube is longitudinally slidable in the interior channel and wherein the distal end portion of the hollow tube inserted into the first relatively wide section of the interior channel with the detachable bung member carried on the distal end of the hollow tube by inter-engagement of its proximal tail portion with the bung-carrying portion of the hollow tube, fluid can be introduced into the envelope through the hollow tube via the fluid delivery orifice in the hollow tube and the interior channel, and wherein the hollow tube can be withdrawn from the interior channel after filling, thereby causing the distal head portion of the bung member to enter into and seal the second relatively narrow section of the interior channel and releasing the proximal tail portion from the bung-carrying portion of the hollow tube.

20. A filling device for use in filling an envelope of a compression-type adjustable optical device with a substantially incompressible fluid to a particular focal length under vacuum, wherein the envelope is formed in part by a distensible membrane having an exterior optical surface; the filling device comprising a hollow body portion which defines an interior passageway and has an inlet portion defining a fluid inlet to the passageway; a hollow tube forming a fluid supply conduit which is adapted for connection to a pumped supply of fluid, extends through the interior passageway in the body portion and comprises a distal end portion protruding from the fluid inlet of the body portion has and having a bung-carrying portion at a distal end thereof and a fluid delivery orifice proximate the distal end; and a detachable bung member having a distal head portion which is shaped and dimensioned to form a tight fit within the inlet portion of the body portion to seal the fluid inlet and a proximal tail portion that is configured to engage releasably with the bung-carrying portion at the distal end of the hollow tube; wherein the inlet portion is configured to be inserted into an envelope of an optical device to be filled or attached to a port on an optical device which communicates with an interior of an envelope to be filled and the hollow tube is longitudinally slidable in the passageway of the body portion wherein when the detachable bung member carried on the distal end of the hollow tube by inter-engagement of the proximal tail portion with the bung-carrying portion of the hollow tube, fluid can be admitted into the envelope though the hollow tube via the fluid delivery orifice and, after filling, the hollow tube can be retracted proximally in the body portion, thereby causing the distal head portion of the bung member to enter into and seal the inlet portion of the body portion and releasing the proximal tail portion from the bung-carrying portion of the hollow tube, thereby allowing the hollow tube to be removed from the inlet portion which is sealed with the bung member.

\* \* \* \* \*